United States Patent
Wengreen et al.

(10) Patent No.: US 10,900,792 B2
(45) Date of Patent: *Jan. 26, 2021

(54) SELF-DRIVING VEHICLE SYSTEMS AND METHODS

(71) Applicant: DRIVENT LLC, Bellevue, WA (US)

(72) Inventors: Eric John Wengreen, Sammamish, WA (US); Wesley Edward Schwie, Minneapolis, MN (US)

(73) Assignee: Drivent LLC, Bellevue, WA (US)

(*) Notice: Subject to any disclaimer, the term of this patent is extended or adjusted under 35 U.S.C. 154(b) by 90 days.

This patent is subject to a terminal disclaimer.

(21) Appl. No.: 16/358,901

(22) Filed: Mar. 20, 2019

(65) Prior Publication Data

US 2020/0124425 A1 Apr. 23, 2020

Related U.S. Application Data

(63) Continuation-in-part of application No. 16/167,126, filed on Oct. 22, 2018, now Pat. No. 10,240,938.

(51) Int. Cl.
| | |
|---|---|
| G01C 21/34 | (2006.01) |
| G08G 1/02 | (2006.01) |
| G05D 1/02 | (2020.01) |
| G08G 1/00 | (2006.01) |
| G05D 1/00 | (2006.01) |

(52) U.S. Cl.
CPC ....... *G01C 21/3407* (2013.01); *G05D 1/0022* (2013.01); *G05D 1/0088* (2013.01); *G08G 1/202* (2013.01)

(58) Field of Classification Search
CPC ............ G01C 21/3407; G01C 21/3438; G01C 21/3423; G05D 1/0022; G05D 1/0088; G08G 1/202

See application file for complete search history.

(56) References Cited

U.S. PATENT DOCUMENTS

| | | |
|---|---|---|
| 4,212,069 A | 7/1980 | Baumann |
| 5,769,471 A | 6/1998 | Suzuki |
| 5,798,695 A | 8/1998 | Metalis |
| 5,871,063 A | 2/1999 | Young |
| 5,945,919 A | 8/1999 | Trask |
| 5,960,523 A | 10/1999 | Husby |
| 5,986,420 A | 11/1999 | Kato |
| 6,011,478 A | 1/2000 | Suzuki |
| 6,081,088 A | 6/2000 | Ishihara |
| 7,093,515 B2 | 8/2006 | Yamanoi |
| 7,298,250 B2 | 11/2007 | Inoue |
| 7,413,357 B2 | 8/2008 | Badalian |
| 7,698,078 B2 | 4/2010 | Kelty |

(Continued)

OTHER PUBLICATIONS

Google Self-Driving Vehicle—Online prior to Apr. 13, 2016 at www.google.com/selfdrivingcar/.

(Continued)

*Primary Examiner* — Tyler J Lee

(57) ABSTRACT

A vehicle management system can send a first pick-up location to a vehicle navigation system and to a remote computing device of a rider. The remote computing device can include an accelerometer that monitors accelerations as the rider carries the remote computing device. Analyzing the accelerations enables the vehicle management system to choose or update a pick-up location to best serve the rider.

33 Claims, 4 Drawing Sheets

(56) References Cited

U.S. PATENT DOCUMENTS

| | | |
|---|---|---|
| 7,777,619 B2 | 8/2010 | Yopp |
| 7,999,701 B1 | 8/2011 | Xu |
| 8,078,359 B2 | 12/2011 | Small |
| 8,180,379 B2 | 5/2012 | Forstall |
| 8,255,124 B2 | 8/2012 | Van Houtan |
| 8,325,025 B2 | 12/2012 | Morgan |
| 8,433,934 B1 | 4/2013 | On |
| 8,634,980 B1 | 1/2014 | Urmson |
| 8,700,251 B1 | 4/2014 | Zhu |
| 8,818,608 B2 | 8/2014 | Cullinane |
| 8,849,494 B1 | 9/2014 | Herbach |
| 8,874,305 B2 | 10/2014 | Dolgov |
| 8,948,993 B2 | 2/2015 | Schulman |
| 8,949,016 B1 | 2/2015 | Ferguson |
| 8,954,217 B1 | 2/2015 | Montemerlo |
| 8,954,252 B1 | 2/2015 | Urmson |
| 8,965,621 B1 | 2/2015 | Urmson |
| 8,996,224 B1 | 3/2015 | Herbach |
| 9,008,890 B1 | 4/2015 | Herbach |
| 9,019,107 B2 | 4/2015 | Biondo |
| 9,026,300 B2 | 5/2015 | Ferguson |
| 9,119,038 B2 | 8/2015 | Woods |
| 9,120,484 B1 | 9/2015 | Ferguson |
| 9,120,485 B1 | 9/2015 | Dolgov |
| 9,139,133 B2 | 9/2015 | Eng |
| 9,194,168 B1 | 11/2015 | Lu |
| 9,262,914 B2 | 2/2016 | Purushothaman |
| 9,272,713 B1 | 3/2016 | Dvoskin |
| 9,290,174 B1 | 3/2016 | Zagorski |
| 9,429,947 B1 | 8/2016 | Wengreen |
| 9,459,622 B2 | 10/2016 | Abhyanker |
| 9,514,623 B1 | 12/2016 | Urrutia |
| 9,527,217 B1 | 12/2016 | Lowy |
| 9,562,785 B1 | 2/2017 | Racah |
| 9,646,356 B1 | 5/2017 | Schwie |
| 9,679,489 B2 * | 6/2017 | Lambert ............ G08G 1/123 |
| 9,685,058 B2 | 6/2017 | Schmidt |
| 9,733,096 B2 | 8/2017 | Colijn |
| 9,915,949 B2 | 3/2018 | Schwie |
| 9,916,703 B2 | 3/2018 | Levinson |
| 9,933,779 B2 * | 4/2018 | Ross ............ G08G 1/161 |
| 9,953,283 B2 | 4/2018 | Sweeney |
| 9,953,539 B1 | 4/2018 | Gkiotsalitis |
| 10,012,515 B2 * | 7/2018 | Wesselius ........ H04W 76/10 |
| 10,036,642 B2 | 7/2018 | Ross |
| 10,050,760 B2 | 8/2018 | Ross |
| 10,082,789 B1 | 9/2018 | Szybalski |
| 10,088,326 B1 * | 10/2018 | Aula ............ G01C 21/26 |
| 10,093,324 B1 | 10/2018 | Szybalski |
| 10,115,029 B1 | 10/2018 | Day |
| 10,127,795 B1 | 11/2018 | Hwang |
| 10,139,828 B2 * | 11/2018 | Ho ............ B60W 30/00 |
| 10,223,844 B1 | 3/2019 | Schwie |
| 10,339,474 B2 * | 7/2019 | Lord ............ G06Q 50/30 |
| 10,345,809 B2 * | 7/2019 | Ross ............ G05D 1/0061 |
| 10,466,057 B1 * | 11/2019 | Schwie ............ G06N 20/00 |
| 10,545,023 B1 * | 1/2020 | Herbach ............ G06Q 50/30 |
| 2002/0077876 A1 | 6/2002 | O'Meara |
| 2002/0121291 A1 | 9/2002 | Daum |
| 2003/0195696 A1 | 10/2003 | Jones |
| 2003/0214585 A1 | 11/2003 | Bakewall |
| 2004/0068354 A1 | 4/2004 | Tabe |
| 2004/0076280 A1 | 4/2004 | Ando |
| 2004/0219933 A1 | 11/2004 | Faith |
| 2007/0096447 A1 | 5/2007 | Tabe |
| 2007/0132567 A1 | 6/2007 | Schofield |
| 2007/0198144 A1 | 8/2007 | Norris |
| 2008/0030906 A1 | 2/2008 | Sato |
| 2008/0144944 A1 | 6/2008 | Breed |
| 2009/0140886 A1 | 6/2009 | Bender |
| 2009/0287367 A1 | 11/2009 | Salinger |
| 2010/0169199 A1 | 7/2010 | Fuller |
| 2011/0059341 A1 | 3/2011 | Matsumoto |
| 2011/0098017 A1 | 4/2011 | Berry |
| 2011/0267186 A1 | 11/2011 | Rao |
| 2012/0009845 A1 | 1/2012 | Schmelzer |
| 2012/0083960 A1 | 4/2012 | Zhu |
| 2012/0158251 A1 | 8/2012 | Van Houtan |
| 2013/0085817 A1 | 4/2013 | Pinkus |
| 2013/0132140 A1 | 5/2013 | Amin |
| 2013/0138460 A1 | 5/2013 | Schumann, Jr. |
| 2013/0197674 A1 | 8/2013 | Lowry |
| 2013/0231824 A1 | 9/2013 | Wilson |
| 2013/0246301 A1 | 9/2013 | Radhakrishnan |
| 2013/0335213 A1 | 12/2013 | Sherony |
| 2014/0129132 A1 | 5/2014 | Yoshizu |
| 2014/0129951 A1 | 5/2014 | Amin |
| 2014/0172727 A1 | 6/2014 | Abhyanker |
| 2014/0253314 A1 | 9/2014 | Rambadt |
| 2014/0316616 A1 | 10/2014 | Kugelmass |
| 2014/0336935 A1 | 11/2014 | Zhu |
| 2014/0350855 A1 | 11/2014 | Vishnuvajhala |
| 2015/0012833 A1 | 1/2015 | Foy |
| 2015/0046080 A1 | 2/2015 | Wesselius |
| 2015/0066284 A1 | 3/2015 | Yopp |
| 2015/0088421 A1 | 3/2015 | Foster |
| 2015/0120504 A1 | 4/2015 | Todasco |
| 2015/0148077 A1 | 5/2015 | Jelle |
| 2015/0149283 A1 | 5/2015 | Horstemeyer |
| 2015/0185034 A1 | 7/2015 | Abhyanker |
| 2015/0199619 A1 | 7/2015 | Ichinose |
| 2015/0248689 A1 | 9/2015 | Paul |
| 2015/0271290 A1 | 9/2015 | Tao |
| 2015/0295949 A1 | 10/2015 | Chizeck |
| 2015/0339923 A1 | 11/2015 | Konig |
| 2015/0339928 A1 | 11/2015 | Ramanujam |
| 2015/0346727 A1 | 12/2015 | Ramanujam |
| 2015/0348221 A1 | 12/2015 | Pedersen |
| 2016/0027306 A1 | 1/2016 | Lambert |
| 2016/0027307 A1 | 1/2016 | Abhyanker |
| 2016/0034828 A1 | 2/2016 | Sarawgi |
| 2016/0034845 A1 | 2/2016 | Hiyama |
| 2016/0046261 A1 | 2/2016 | Gulash |
| 2016/0071056 A1 | 3/2016 | Ellison |
| 2016/0092976 A1 | 3/2016 | Marusyk |
| 2016/0116293 A1 | 4/2016 | Grover |
| 2016/0125735 A1 | 5/2016 | Tuukkanen |
| 2016/0140835 A1 | 5/2016 | Smith |
| 2016/0129880 A1 | 6/2016 | Cuddihy |
| 2016/0182170 A1 | 6/2016 | Daoura |
| 2016/0187150 A1 | 6/2016 | Sherman |
| 2016/0209220 A1 | 7/2016 | Laetz |
| 2016/0209843 A1 | 7/2016 | Meuleau |
| 2016/0216130 A1 | 7/2016 | Abramson |
| 2016/0227193 A1 | 8/2016 | Osterwood |
| 2016/0247095 A1 | 8/2016 | Scicluna |
| 2016/0247106 A1 | 8/2016 | Dalloro |
| 2016/0247109 A1 | 8/2016 | Scicluna |
| 2016/0264021 A1 | 9/2016 | Gillett |
| 2016/0277560 A1 | 9/2016 | Gruberman |
| 2016/0301698 A1 | 10/2016 | Katara |
| 2016/0342934 A1 | 11/2016 | Michalik |
| 2016/0360382 A1 | 12/2016 | Gross |
| 2016/0364812 A1 | 12/2016 | Cao |
| 2016/0364823 A1 | 12/2016 | Coa |
| 2016/0370194 A1 * | 12/2016 | Colijn ............ G01C 21/343 |
| 2017/0024393 A1 | 1/2017 | Choksi |
| 2017/0050321 A1 | 2/2017 | Look |
| 2017/0068245 A1 | 3/2017 | Scofield |
| 2017/0075358 A1 | 3/2017 | Zhang |
| 2017/0089715 A1 | 3/2017 | Guo |
| 2017/0090480 A1 | 3/2017 | Ho |
| 2017/0103490 A1 | 4/2017 | Haparnas |
| 2017/0127215 A1 | 5/2017 | Khan |
| 2017/0129399 A1 | 5/2017 | Appukutty |
| 2017/0132540 A1 | 5/2017 | Haparnas |
| 2017/0144774 A1 | 5/2017 | Pollard |
| 2017/0147951 A1 * | 5/2017 | Meyer ............ G06Q 10/02 |
| 2017/0147959 A1 | 5/2017 | Sweeney |
| 2017/0213165 A1 | 7/2017 | Stauffer |
| 2017/0219362 A1 * | 8/2017 | Bryson ............ G01C 21/206 |
| 2017/0248949 A1 | 8/2017 | Moran |
| 2017/0277191 A1 | 9/2017 | Fairfield |
| 2017/0286884 A1 * | 10/2017 | Shoval ............ G06Q 10/063114 |

(56) References Cited

U.S. PATENT DOCUMENTS

| | | | |
|---|---|---|---|
| 2017/0300053 A1 | 10/2017 | Wengreen | |
| 2017/0301220 A1 | 10/2017 | Jarrell | |
| 2017/0313321 A1 | 11/2017 | Jefferies | |
| 2017/0316516 A1 | 11/2017 | Goldman-Shenhar | |
| 2017/0316533 A1 | 11/2017 | Goldman-Shenhar | |
| 2017/0316621 A1 | 11/2017 | Jefferies | |
| 2017/0327082 A1 | 11/2017 | Kamhi | |
| 2017/0337437 A1 | 11/2017 | Kanagaraj | |
| 2017/0344010 A1* | 11/2017 | Rander | G05D 1/0022 |
| 2017/0352250 A1 | 12/2017 | de Barros Chapiewski | |
| 2017/0357973 A1 | 12/2017 | Van Os | |
| 2017/0363430 A1 | 12/2017 | Al-Dahle | |
| 2017/0365030 A1* | 12/2017 | Shoham | G06Q 10/02 |
| 2017/0372394 A1 | 12/2017 | Chan | |
| 2018/0060778 A1 | 3/2018 | Guo | |
| 2018/0061242 A1 | 3/2018 | Bavar | |
| 2018/0075565 A1 | 3/2018 | Myers | |
| 2018/0108103 A1 | 4/2018 | Li | |
| 2018/0109934 A1 | 4/2018 | Grube | |
| 2018/0115924 A1 | 4/2018 | Harris | |
| 2018/0126960 A1 | 5/2018 | Reibling | |
| 2018/0130161 A1* | 5/2018 | Wengreen | G05D 1/0027 |
| 2018/0137693 A1 | 5/2018 | Raman | |
| 2018/0156625 A1 | 6/2018 | Mangal | |
| 2018/0157268 A1 | 6/2018 | Mangal | |
| 2018/0189717 A1 | 7/2018 | Cao | |
| 2018/0191596 A1 | 7/2018 | Bhaya | |
| 2018/0196417 A1 | 7/2018 | Iagnemma | |
| 2018/0211540 A1 | 7/2018 | Bedegi | |
| 2018/0211541 A1* | 7/2018 | Rakah | B60W 60/00253 |
| 2018/0220189 A1 | 8/2018 | Hodge | |
| 2018/0225749 A1 | 8/2018 | Shoen | |
| 2018/0225890 A1 | 8/2018 | Jales Costa | |
| 2018/0238694 A1* | 8/2018 | Bellotti | G01C 21/3423 |
| 2018/0342035 A1* | 11/2018 | Sweeney | G08G 1/202 |
| 2018/0356239 A1* | 12/2018 | Marco | G01C 21/3438 |
| 2018/0357907 A1 | 12/2018 | Reiley | |
| 2019/0035277 A1 | 1/2019 | Son | |
| 2019/0066046 A1* | 2/2019 | Nathani | H04W 4/023 |
| 2019/0108539 A1* | 4/2019 | Watanabe | G05D 1/0287 |
| 2019/0333390 A1* | 10/2019 | Woodrow | G08G 1/207 |
| 2019/0353495 A1* | 11/2019 | Dyer | G06F 16/29 |
| 2019/0370921 A1* | 12/2019 | Nigam | G01C 21/3423 |

OTHER PUBLICATIONS

Tesla Autopilot—Online prior to Apr. 13, 2016 at www.technologyreview.com/s/600772/10-breakthrough-technologies-2016-tesla-autopilot/.

Tesla Model S Software Version 7—Autopilot—Online prior to Apr. 13, 2016 at www.teslamotors.com/presskit/autopilot.

BMW Heads Up Display—Online prior to Apr. 13, 2016 at www.autotrader.com/car-news/full-color-heads-up-display-to-debut-on-new-3-series-132586.

Uber Details—Online prior to Apr. 13, 2016 at www.wikihow.com/Use-Uber.

Raspberry Pi: How can I detect the direction of a sound—Online prior to Apr. 13, 2016 at www.quora.com/Raspberry-Pi-1/How-can-I-detect-the-direction-of-a-sound.

Wikipedia: Biometric Device—Downloaded on Aug. 19, 2016 from en.wikipedia.org/wiki/Biometric_device.

Self-Driving Cars Go Public; Uber Offers Rides in Pittsburgh—Downloaded on Aug. 19, 2016 from www.yahoo.com/news/uber-autonomous-cars-haul-people-125127470.html?ref=gs.

Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.

Zach Epstein, You'll be riding in self-driving cars as soon as next year, May 6, 2016, BGR.com, http://bgr.com/2016105'06/lyft-self-driving-cars-2017/, pp. 1-5.

Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.

Explain That Stuff: Smoke Detectors—Downloaded on Sep. 28, 2018 from www.explainthatstuff.com/smokedetector.html.

Nittan: EV-DP Smoke Detector—Downloaded on Sep. 28, 2018 from nittan.co.uk/products/products/ev/ev-dp.

Wikipedia: Rain Sensor—Downloaded on Sep. 28, 2018 from en.wikipedia.org/wiki/Rain_sensor.

Nest: Split-Spectrum White Paper—Downloaded on Oct. 1, 2018 from nest.com/support/images/misc-assets/Split-Spectrum-Sensor-White-Paper.pdf.

How Police Visually Detect Drunk Drivers—Downloaded on Oct. 19, 2018 from thelaw.com/law/how-police-visually-detect-drunk-drivers.185.

Velodyne VLS-128 LiDAR Sensor—Downloaded on Oct. 22, 2018 from velodynelidar.com/vls-128.html.

Waymo's Suite of Custom-Built, Self-Driving Hardware—Downloaded on Oct. 22, 2018 from medium.com/waymo/introducing-waymos-suite-of-custom-built-self-driving-hardware-c47d1714563.

Lidar—Downloaded on Oct. 24, 2018 from en.wikipedia.org/wiki/Lidar.

Radar—Downloaded on Oct. 24, 2018 from en.wikipedia.org/wiki/Radar.

Assisted GPS—Downloaded on Nov. 19, 2018 from lifewire.com/assisted-gps-1683306.

How GPS Works—Downloaded on Nov. 19, 2018 from lifewire.com/iphone-gps-set-up-1683393.

Indoor Positioning System—Downloaded on Nov. 19, 2018 from en.wikipedia.org/wiki/Indoor_positioning_system.

LTE—Downloaded on Nov. 27, 2018 from en.wikipedia.org/wiki/LTE_(telecommunication).

OTDOA—Downloaded on Nov. 27, 2018 from en.wikipedia.org/wiki/OTDOA.

Ping for Beginners—Downloaded on Jan. 30, 2019 from https://social.technet.microsoft.com/wiki/contents/articles/30110.ping-for-beginners.aspx.

* cited by examiner

SELF-DRIVING VEHICLE SYSTEMS AND METHODS

CROSS-REFERENCE TO RELATED APPLICATIONS

The entire contents of the following application are incorporated by reference herein: U.S. patent application Ser. No. 16/167,126; filed Oct. 22, 2018; and entitled SELF-DRIVING VEHICLE SYSTEMS AND METHODS.

The entire contents of the following application are incorporated by reference herein: U.S. patent application Ser. No. 16/205,013; filed Nov. 29, 2018; and entitled SELF-DRIVING VEHICLE SYSTEMS AND METHODS.

BACKGROUND

Field

Various embodiments disclosed herein relate to vehicles. Certain embodiments relate to self-driving vehicles.

Description of Related Art

Vehicles typically require a driver. These vehicles often can only perform actions when directly steered by the driver. However, some self-driving vehicles are not reliant upon drivers and can perform actions based upon particular events. Self-driving vehicles can dramatically increase travel safety and convenience. As a result, there is a need for systems and methods that enable self-driving vehicles to perform actions based upon particular events.

SUMMARY

Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles have unlimited attention spans and can process complex sensor data nearly instantaneously. The ability of self-driving vehicles to save lives is so impressive that society has a moral imperative to develop self-driving technology such that it can be widely adopted.

Self-driving vehicles also have the ability to dramatically save time and improve convenience in roadway travel. Specifically, self-driving vehicles have unlimited potential to learn and predict human behavior and perform actions accordingly. Some embodiments enable a self-driving vehicle to monitor human activity and predict when and where the human will be located and whether the human needs a ride from the self-driving vehicle. Self-driving vehicles will be able to perform such tasks with incredible efficacy and accuracy that will allow self-driving vehicles to proliferate at a much faster rate than would otherwise be the case.

In some embodiments, a vehicle management system comprises a vehicle having a vehicle navigation system. The vehicle management system can be configured to send a first pick-up location to the vehicle navigation system. A communication system can be configured to send the first pick-up location to a remote computing device of a first rider. The communication system can be configured to send a first wireless communication to the remote computing device. The first wireless communication can be configured to enable the remote computing device to direct the first rider toward the first pick-up location.

In some embodiments, the vehicle management system comprises a location tracking system configured to monitor a location of the first rider. The vehicle management system can be configured to determine, based on the location of the first rider, that the vehicle could rendezvous with the first rider faster by using a second pick-up location located away from the first pick-up location. The communication system can be configured to send a second communication to the vehicle navigation system. The second communication can be configured to prompt the vehicle navigation system to cease directing the vehicle toward the first pick-up location and instead direct the vehicle toward the second pick-up location.

In some embodiments, the communication system is configured to send a third wireless communication to the remote computing device. The third wireless communication can be configured to prompt the remote computing device to cease directing the first rider toward the first pick-up location and instead direct the first rider toward the second pick-up location.

In some embodiments, the vehicle management system comprises a location tracking system configured to monitor a location of the first rider. The communication system can be configured to send a second wireless communication to the remote computing device in response to the location tracking system determining that the first rider is moving away from at least one of the first pick-up location and a first walking route to the first pick-up location. The second wireless communication can be configured to prompt the remote computing device to present an option for the first rider to replace the first pick-up location with the second pick-up location. In several embodiments, the second wireless communication can be configured to prompt the remote computing device to replace the first pick-up location with the second pick-up location. The second pick-up location can be located closer than the first pick-up location to the present location of the first rider.

In some embodiments, the vehicle management system comprises a rendezvous mode in which the vehicle management system is configured to direct both the vehicle and the first rider toward the first pick-up location.

In some embodiments, the vehicle management system comprises a rescue mode in which the vehicle management system is configured to direct the vehicle toward a location of the first rider and is configured to prompt the first rider to remain at the location of the first rider.

In some embodiments, the vehicle management system comprises a location tracking system configured to monitor the location of the first rider.

In some embodiments, the vehicle management system is configured to exit the rendezvous mode and enter the rescue mode in response to determining, by the location tracking system, that the first rider is moving away from at least one of the first pick-up location and a first walking route to the first pick-up location.

In some embodiments, the vehicle management system comprises a location tracking system configured to monitor a location of the first rider. The location tracking system can be configured to analyze a walking speed of the first rider. The vehicle management system can be configured to suggest a second pick-up location located away from the first pick-up location and located closer than the first pick-up location to the present location of the first rider in response to determining that the walking speed is below a predetermined threshold.

In some embodiments, the communication system is configured to send a second wireless communication to the remote computing device in response to vehicle management system determining that the walking speed is below the predetermined threshold. The second wireless communication can be configured to prompt the remote computing device to present an option for the first rider to replace the first pick-up location with the second pick-up location. In several embodiments, the second wireless communication is configured to prompt the remote computing device to cease guiding the first rider to the first pick-up location and instead guide the first rider to the second pick-up location.

In some embodiments, the vehicle management system comprises a location tracking system configured to monitor a location of the first rider. The location tracking system can be configured to analyze a movement speed of the first rider (e.g., as the rider moves towards the first pick-up location). The communication system can be configured to send a second wireless communication to the remote computing device in response to the location tracking system determining that the movement speed is below a predetermined threshold. The second wireless communication can be configured to prompt the remote computing device to present an option for the first rider to replace the first pick-up location with a second pick-up location located closer than the first pick-up location to the present location of the first rider. In several embodiments, the second wireless communication is configured to prompt the remote computing device to guide the first rider toward the second pick-up location.

In some embodiments, the vehicle management system comprises a remote computing device that has a movement analysis system configured to monitor movement of the first rider. The remote computing device can be configured to present an option, in response to the movement analysis system determining that the movement is below a predetermined threshold, for the first rider to replace the first pick-up location with a second pick-up location located closer than the first pick-up location to a location of the first rider.

In some embodiments, the remote computing device is configured to replace, in response to the movement analysis system determining that the movement is below a predetermined threshold, the first pick-up location with a second pick-up location located closer than the first pick-up location to a present location of the first rider. The remote computing device can be configured to send, in response to the movement analysis system determining that the movement is below a predetermined threshold, a wireless communication to the vehicle navigation system. The wireless communication can be configured to prompt the vehicle navigation system to navigate the vehicle to the second pick-up location (rather than to the first pick-up location).

Some embodiments comprise receiving, by the vehicle management system, a first pick-up location for a first rider; directing, by the vehicle management system, a vehicle to move toward the first pick-up location by following a first driving route; and/or directing, by the vehicle management system, the first rider to move toward the first pick-up location by following a first walking route.

Some embodiments comprise (after directing the vehicle and the first rider toward the first pick-up location) monitoring, by the vehicle management system, a location of the first rider; determining, by the vehicle management system, that the vehicle could rendezvous with the first rider faster by using a second pick-up location located away from the first pick-up location; directing, by the vehicle management system, the vehicle to move toward the second pick-up location by following a second driving route; and/or directing, by the vehicle management system, the first rider to move toward the second pick-up location by following a second walking route.

Some embodiments comprise (in response to determining that the vehicle could rendezvous with the first rider faster by using the second pick-up location) prompting, by the vehicle management system, the first rider to replace the first pick-up location with the second pick-up location.

Some embodiments comprise (after directing the vehicle and the first rider toward the first pick-up location) monitoring, by the vehicle management system, a location of the first rider, and/or prompting, by the vehicle management system, the first rider to replace the first pick-up location with a second pick-up location in response to determining that the first rider is moving away from at least one of the first pick-up location and the first walking route.

Some embodiments comprise directing, by the vehicle management system, the vehicle to move toward the second pick-up location by following a second driving route, and/or directing, by the vehicle management system, the first rider to move toward the second pick-up location by following a second walking route. The second pick-up location can be located closer than the first pick-up location to the location of the first rider during the prompting.

In some embodiments, the vehicle management system comprises a rendezvous mode in which the vehicle management system directs both the vehicle and the first rider toward the first pick-up location. The vehicle management system can comprise a rescue mode in which the vehicle management system directs the vehicle toward a location of the first rider and prompts the first rider to remain at the location of the first rider.

Embodiments can comprise (after entering the rendezvous mode and directing the vehicle and the first rider toward the first pick-up location) monitoring, by the vehicle management system, the location of the first rider; and/or exiting the rendezvous mode and entering the rescue mode in response to determining that the first rider is moving away from at least one of the first pick-up location and the first walking route.

Some embodiments comprise (after directing the vehicle and the first rider toward the first pick-up location) determining, by the vehicle management system, that a second pick-up location located away from the first pick-up location is better suited to picking up the first rider; directing, by the vehicle management system, the vehicle to move toward the second pick-up location by following a second driving route; and/or directing, by the vehicle management system, the first rider to move toward the second pick-up location by following a second walking route.

In some embodiments, determining that the second pick-up location is better suited (than the first pick-up location) comprises determining that the first rider has moved away from the first walking route.

In some embodiments, determining that the second pick-up location is better suited comprises analyzing a movement speed of the first rider; estimating a first arrival time of the first rider at the first pick-up location based on the movement speed; and/or estimating a second arrival time of the first rider at the second pick-up location based on the movement speed. In several embodiments, determining that the second pick-up location is better suited comprises determining that the second arrival time is sooner than the first arrival time.

In some embodiments, determining that the second pick-up location is better suited comprises identifying the second pick-up location; estimating a first time until the vehicle would arrive at the first pick-up location; estimating a second time until the first rider would arrive at the first pick-up location; estimating a third time until the vehicle would arrive at the second pick-up location; estimating a fourth time until the first rider would arrive at the second pick-up location; and/or determining that the greater of the first time and the second time is greater than the greater of the third time and the fourth time.

In several embodiments, determining that the second pick-up location is better suited comprises determining that the greater of the first time and the second time is at least 10 percent greater than the greater of the third time and the fourth time. In several embodiments, determining that the second pick-up location is better suited comprises determining that the greater of the first time and the second time is at least 20 percent greater than the greater of the third time and the fourth time. In several embodiments, determining that the second pick-up location is better suited comprises determining that the greater of the first time and/or the second time is greater than the greater of the third time and/or the fourth time.

Some embodiments comprise (after directing the vehicle and the first rider toward the first pick-up location) choosing, by the vehicle management system, a second pick-up location located away from the first pick-up location and located closer than the first pick-up location to a present location of the first rider in response to determining, by the vehicle management system, that the first rider is no longer advancing toward the first pick-up location.

In some embodiments, the second pick-up location is within a predetermined distance of the location of the first rider. The predetermined distance can be 100 feet, 250 feet, 950 feet, and/or any suitable distance. Some embodiments comprise analyzing a database of previous pick-up spots to select the second pick-up location.

Some methods comprise directing, by the vehicle management system, the vehicle to move toward the second pick-up location by following a second driving route.

Some embodiments comprise (after directing the vehicle and the first rider toward the first pick-up location) analyzing, by a location tracking system, a walking speed of the first rider. Some embodiments comprise choosing, by the vehicle management system, a second pick-up location located away from the first pick-up location and located closer than the first pick-up location to a location of the first rider in response to determining, by the vehicle management system, that the walking speed is below a predetermined threshold.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
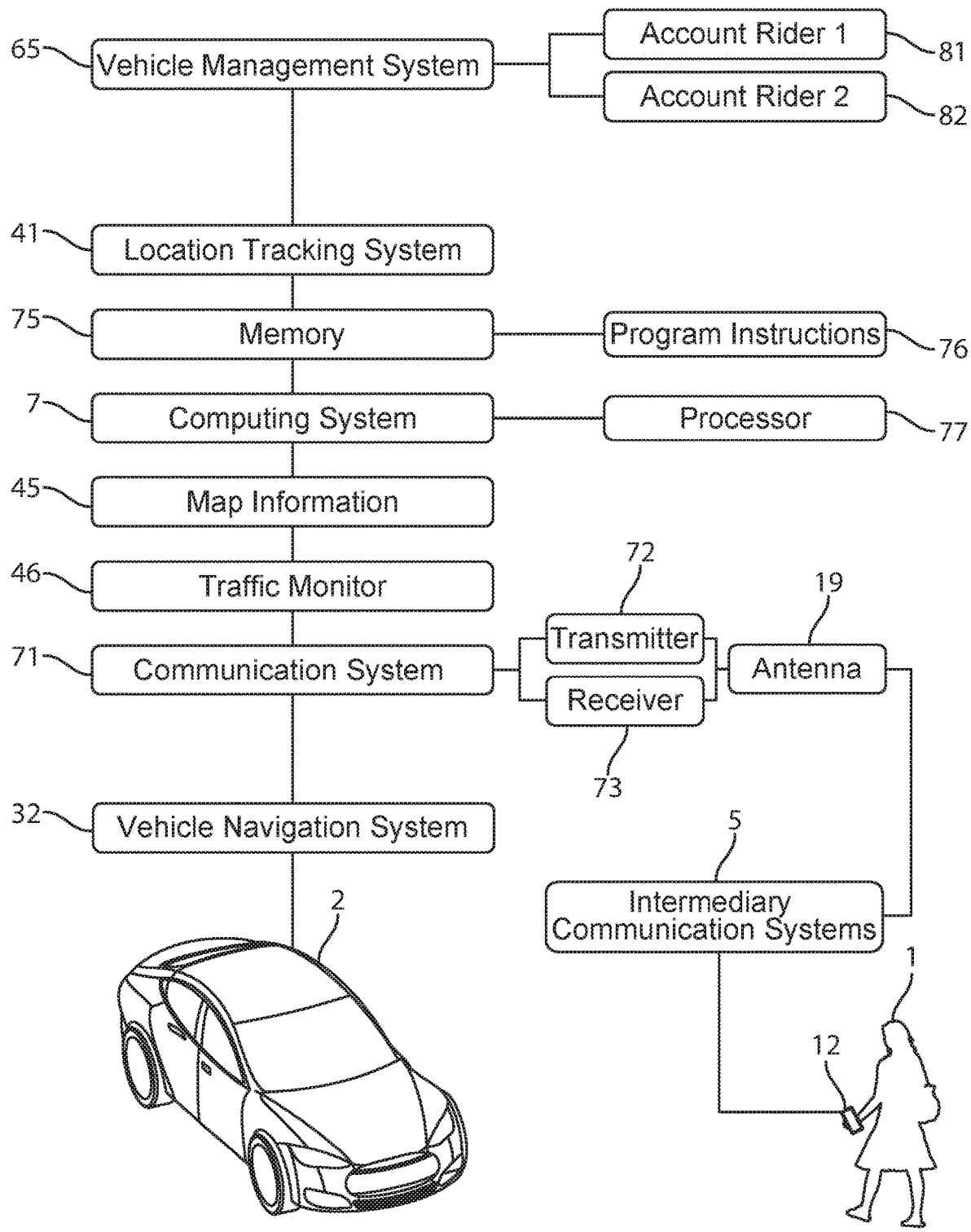
FIG. 1 illustrates a diagrammatic view that includes a self-driving vehicle configured to pick up a rider, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Alphabet Inc. and Tesla Motors Inc. have built self-driving vehicles.) The ability of self-driving vehicles to save lives is so impressive that society has a moral imperative to develop self-driving technology such that it can be widely adopted.

Although self-driving vehicles will unlock many safety benefits, there are several barriers to rapid adoption of self-driving vehicles. Some of the embodiments described herein overcome several of these barriers.

Self-driving cars are sometimes referred to as autonomous cars, autonomous vehicles, driverless cars, and driverless vehicles. Various levels of "self-driving" behaviors are available to sense surrounding environments and navigate appropriately (e.g., without hitting objects, in a time-efficient manner). Levels of self-driving vehicles comprise Level 1 (Driver Assistance), Level 2 (Partial Automation), Level 3 (Conditional Automation), Level 4 (High Automation), and Level 5 (Full Automation). Of course, other levels and distinctions are possible. The National Highway Traffic Safety Administration has outlined various levels of self-driving vehicle automation based on information from the Society of Automotive Engineers.

Some embodiments can be used with self-driving vehicles. The embodiments, however, are not limited to self-driving vehicles and can be used with non-self-driving vehicles.

In some embodiments, the vehicle management system directs the vehicle and a prospective rider towards a pick-up location that is located away from both the vehicle and the rider. For example, the rider can open software such as application software (an "app") on her remote computing device. The app can enable the rider to request a ride. The app can use the rider's location to suggest several different potential pick-up locations. Each pick-up location can have unique benefits. One potential pick-up location might be the least expensive of the pick-up location options suggested by the app (e.g., because that pick-up location enables carpooling). Another potential pick-up location might be the easiest for the rider to find (e.g., because the rider is familiar with that pick-up location). Another pick-up location might provide the quickest pick up (e.g., because that pick-up location is closest to the rider).

Once the rider selects one of the suggested pick-up locations, the vehicle management system can direct both the vehicle and the rider to the selected pick-up location. Future factors, however, may change the optimal or preferred pick-up location. If the optimal or preferred pick-up location changes, the vehicle management system can cease directing the vehicle to the first selected pick-up location and may begin directing both the vehicle and the rider to another pick-up location.

The rider could become lost or injured on her way to the first selected pick-up location. The vehicle management system can detect that the rider took a wrong turn or that she is no longer moving towards the selected pick-up location. In response, the vehicle management system may update the pick-up location.

Referring now primarily to FIG. 1, a vehicle management system 65 can send a first pick-up location to a remote computing device 12 of a prospective rider 1. A location tracking system 41 is configured to monitor a location of the rider 1 as the rider 1 walks to rendezvous with the vehicle 2.

The location tracking system 41 can include a computer and a communication system comprising a receiver, a transmitter, and an antenna. The location tracking system 41 can be configured to receive GPS location data directly from satellites or indirectly from other computers that have GPS location data. The location tracking system 41 can be configured to receive radio-frequency transmissions (which can be helpful for indoor location tracking).

The vehicle management system 65 can later determine, based on the location of the rider 1 as the rider 1 walks to rendezvous with the vehicle 2, that the vehicle 2 could rendezvous with the rider 1 sooner by using a second pick-up location. The vehicle management system 65 can prompt the vehicle navigation system 32 to cease directing the vehicle 2 toward the first pick-up location and instead direct the vehicle 2 toward the second pick-up location. The vehicle management system 65 can prompt the remote computing device 12 to cease directing the rider toward the first pick-up location and instead direct the rider toward the second pick-up location.

Figure 2:
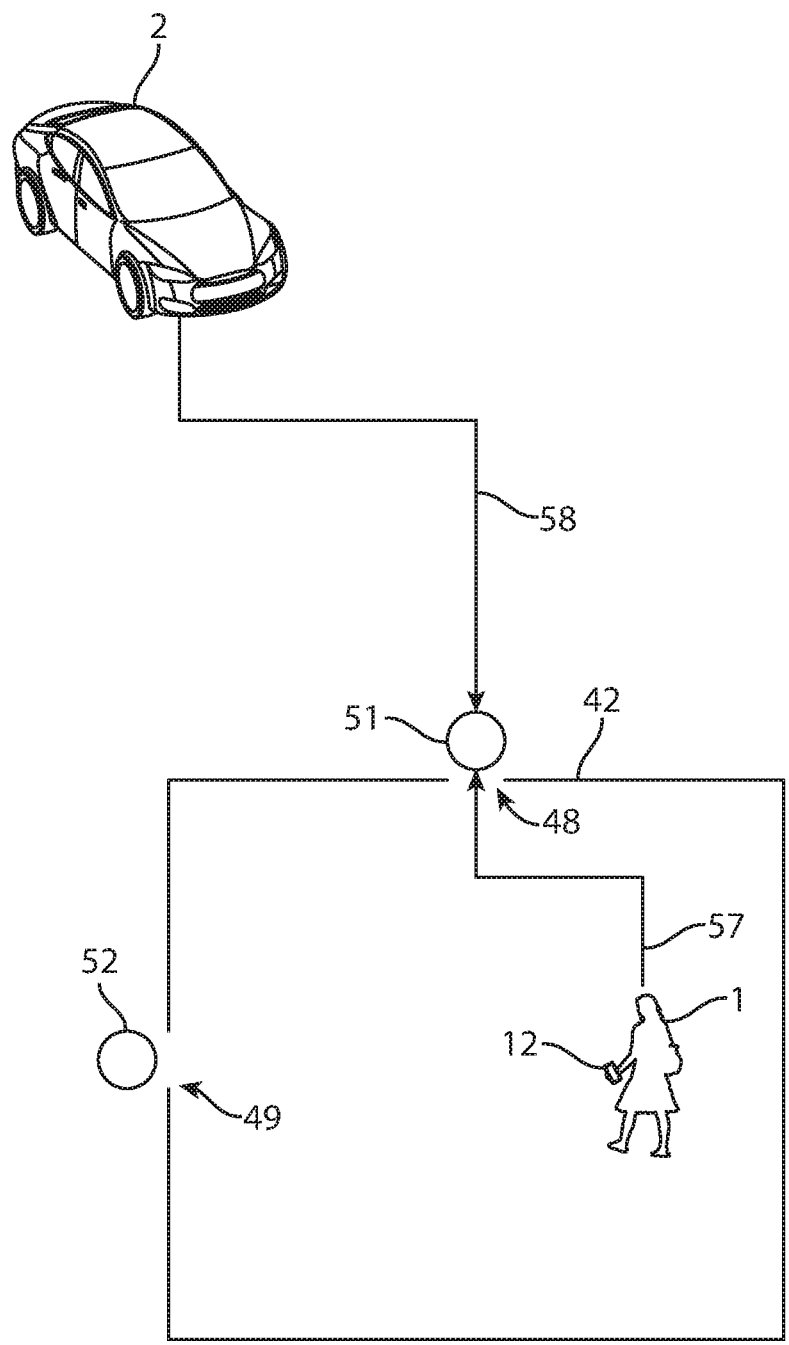
FIG. 2 illustrates a diagrammatic view of a self-driving vehicle picking up a rider, according to some embodiments.

Referring now primarily to FIGS. 1 and 2, a prospective rider 1 can need a ride from a vehicle 2. The rider 1 can be located outdoors or can be located inside a building 42 (e.g., a large commercial building, a large university building, a large apartment complex, a small building). The building 42 can include several exits 48, 49. Reasonable pick-up locations 51, 52 are located outside of each exit 48, 49. The rider 1 (who is not yet riding in the vehicle 2) can use an app on her remote computing device 12 to select a first pick-up location 51. The remote computing device 12 can send the selected pick-up location 51 to the vehicle management system 65 via intermediary communication systems 5. Then, the vehicle management system 65 can send the pick-up location 51 to the vehicle navigation system 32 via intermediary communication systems 5.

The remote computing device 12 (e.g., via an app or other software) can direct the rider 1 toward the first pick-up location 51 along a first walking route 57. The vehicle navigation system 32 can direct the vehicle 2 toward the first pick-up location 51 along a first driving route 58.

While the vehicle 2 and the rider 1 are moving toward the first pick-up location, an item can be detected (e.g., as explained herein and/or incorporated by reference) that triggers the vehicle management system 65 to consider other pick-up locations.

Figure 3:
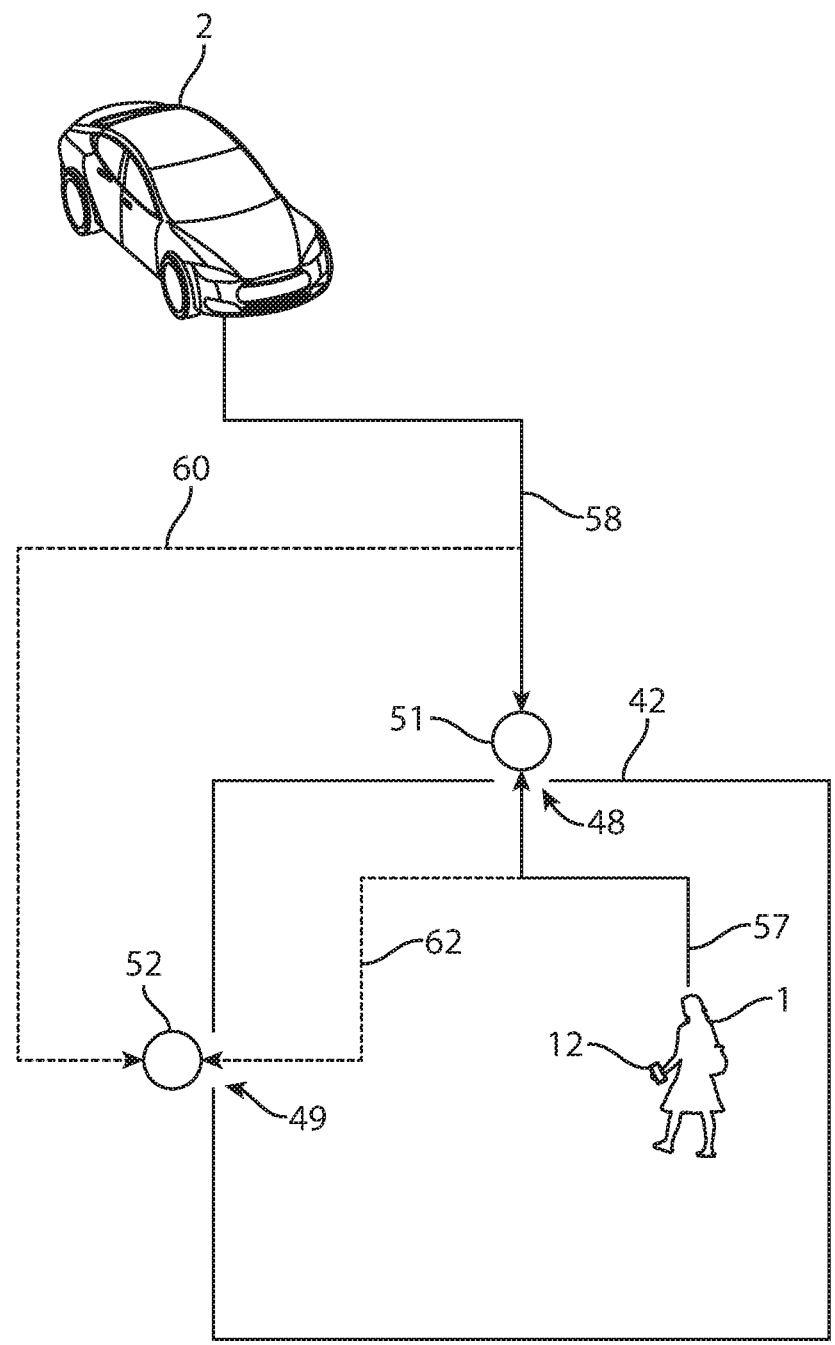
FIG. 3 illustrates a diagrammatic view of a self-driving vehicle picking up a rider using alternative routes, according to some embodiments.

Referring now primarily to FIGS. 1 and 3, the vehicle management system 65 can begin directing the rider 1 towards the second pick-up location 52 (e.g., by sending information to the remote computing device 12 of the first rider 1 that enables the rider 1 to follow a second walking route 62). The vehicle management system 65 can begin directing the vehicle 2 towards the second pick-up location 52 (e.g., by sending information to the vehicle navigation system 32 that enables the vehicle 2 to follow a second driving route 60). The second driving route 60 and the second walking route 62 are illustrated by broken lines in FIG. 3.

As mentioned previously, while the vehicle 2 and the rider 1 are moving toward the second pick-up location, an item can be detected that triggers the vehicle management system 65 to consider other pick-up locations. This process of continuing to consider additional pick-up locations can continue (e.g., until the rider 1 enters the vehicle 2).

The vehicle management system 65 can include data regarding a first account 81 for a first rider 1 and can include data regarding a second account 82 for another rider. The account information can include an identity of the rider 1, billing information, ride history, pick-up location preferences, a picture of the rider 1, a rider profile, and any other information relevant to the rider 1.

Various embodiments include at least one memory 75 comprising program instructions 76 that when executed by at least one processor 77 of at least one computing system 7 perform the method steps described herein. The memory 75 can comprise map information 45 (including street information, preferred pick-up locations, and preferred drop-off locations).

Embodiments can comprise a location tracking system 41 configured to monitor a location of a rider. A traffic monitor 46 can be configured to monitor traffic data sensed directly by the vehicle 2 or received by the vehicle management system 65 from other sources (such as Google Maps).

Embodiments can comprise a communication system 71 having a transmitter 72, a receiver 73, and an antenna 19. Intermediary communication systems 5 can be used to send communications between remote computing devices 12, the vehicle 2, the communication system 71, a traffic monitor 46, location tracking systems 41, computing systems 7, and/or the vehicle management system 65.

In some embodiments, the vehicle management system 65 is mechanically coupled to the vehicle 2. In some embodiments, the vehicle management system 65 is not mechanically coupled to the vehicle 2 and/or is run on servers located far from the vehicle 2 and the remote computing device 12. In some embodiments, the vehicle management system 65 is located remotely relative to the vehicle 2. In some embodiments, a portion of the vehicle management system 65 is mechanically coupled to the vehicle 2 and another portion of the vehicle management system 65 is not mechanically coupled to the vehicle 2 but is communicatively coupled to the vehicle 2.

The vehicle management system 65 can be a portion of the self-driving vehicle 2. Communication between the vehicle 2 and the vehicle management system 65 can occur via electrical wires that couple the vehicle management system 65 to other portions of the vehicle 2.

In some embodiments, the vehicle management system 65 is located remotely relative to the self-driving vehicle 2. Communication between the vehicle 2 and the vehicle management system 65 can occur via wireless communications that travel over intermediary communication systems 5.

In some embodiments, intermediary communication systems 5 are used to perform each step. Intermediary communication systems 5 can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

A remote computing device 12 can be a smartphone, a smartwatch, a tablet computer, a laptop computer, a desktop computer, augmented reality glasses, an implanted computer, and/or any type of computer.

In some embodiments, a rider carries her remote computing device 12 into the vehicle 2 and uses her remote computing device 12 while she waits for the vehicle 2 to move and while the vehicle 2 drives her to her drop-off location.

The vehicle management system 65 can be configured to be communicatively coupled with a remote computing device 12, which can be configured to operate software, such as an iPhone software application (an "app") or an Android software application (an "app") adapted to enable a user to control behaviors of the self-driving vehicle 2. Behaviors can include actions and non-actions of the self-driving vehicle 2, such as picking up the user at a location, picking up the user at a time based on a schedule of the user or a time based on past pick-up times, remaining idle, driving to a residence of the user, pulling out of a garage, parking the vehicle, getting gas, charging the vehicle, and the like.

The communicative coupling between the remote computing device 12 and the vehicle management system 65 can be via intermediary communication systems 5. In other words, intermediary communication systems 5 can communicatively couple the remote computing device 12 and the vehicle management system 65. This communicative coupling may be via intermittent wireless communications. For example, the vehicle management system 65 may send a wireless message to the remote computing device 12 periodically (e.g., every 10 seconds, every 60 seconds, every 10 minutes). As used herein, "periodically" does not imply that every period has the same duration. In some embodiments, the communicative coupling between the self-driving vehicle 2 and the vehicle management system 65 is via intermediary communication systems 5.

The vehicle management system 65 can be wirelessly communicatively coupled to the self-driving vehicle 2 via intermediary communication systems 5. The remote computing device 12 can be wirelessly communicatively coupled to the vehicle management system 65 via intermediary communication systems 5. Intermediary communication systems 5 can comprise wireless networks, cellular networks, telephone networks, Internet systems, servers, cloud computing, remotely located computers, radio communication systems, satellite systems, communication systems, and any other suitable means of enabling wired and/or wireless communication between the remote computing device 12, the vehicle management system 65, and/or the self-driving vehicle 2.

In embodiments that include elements such as sending information or otherwise communicating, the remote computing device 12, the vehicle management system 65, the vehicle navigation system 32, the communication system 71, the location tracking system 41, and the self-driving vehicle 2 can do these elements by using intermediary communication systems 5. For example, the remote computing device 12, the vehicle management system 65, and the self-driving vehicle 2 may send wireless communications and/or receive wireless communications via intermediary communication systems 5, which can serve as a communication bridge between the remote computing device 12, the vehicle management system 65, and the self-driving vehicle 2. The vehicle management system 65 can be communicatively coupled to the vehicle navigation system 32 via intermediary communication systems 5.

The communication system 71 can be configured to send wired or wireless communications to a remote computing device 12 (e.g., from the vehicle management system 65) directly (e.g., via radio communications such as Bluetooth) or indirectly (e.g., via intermediary communication systems 5).

The communication system 71 can be configured to send wired or wireless communications to a vehicle navigation system 32 (e.g., from the vehicle management system 65) directly (e.g., via radio communications such as Bluetooth) or indirectly (e.g., via intermediary communication systems 5).

As used herein, a "direct wireless communication" is a wireless communication that does not use intermediary communication systems 5 for communicative coupling between the remote computing device 12 and an antenna 19 that, in some embodiments, is mechanically coupled to the vehicle 2. For example, the vehicle 2 can communicate directly with a remote computing device 12 located inside the vehicle 2 via Bluetooth. This Bluetooth communication is one example of a direct wireless communication. Other communication protocols other can Bluetooth can also enable direct wireless communication. Other radio communication systems can enable direct wireless communication.

As used herein, "location" is used broadly and is not limited to a street address. A location can be a Global Positioning System ("GPS") location and can be any other location indicator. A location can be an outdoor location. A location can be an indoor location (e.g., a location inside a large shopping center or apartment complex).

Some embodiments use iBeacon hardware to enable tracking remote computing devices indoors. iBeacon is a protocol developed by Apple Inc. Several embodiments use radio transceivers (such as Bluetooth transceivers) to enable tracking remote computing devices indoors.

Some embodiments use Global Positioning System ("GPS") hardware to determine an outdoor location of a remote computing device.

In some embodiments, each system comprises at least one processor 77 and a memory 75 comprising program instructions that when executed by the at least one processor cause the system to perform method steps.

Figure 4:
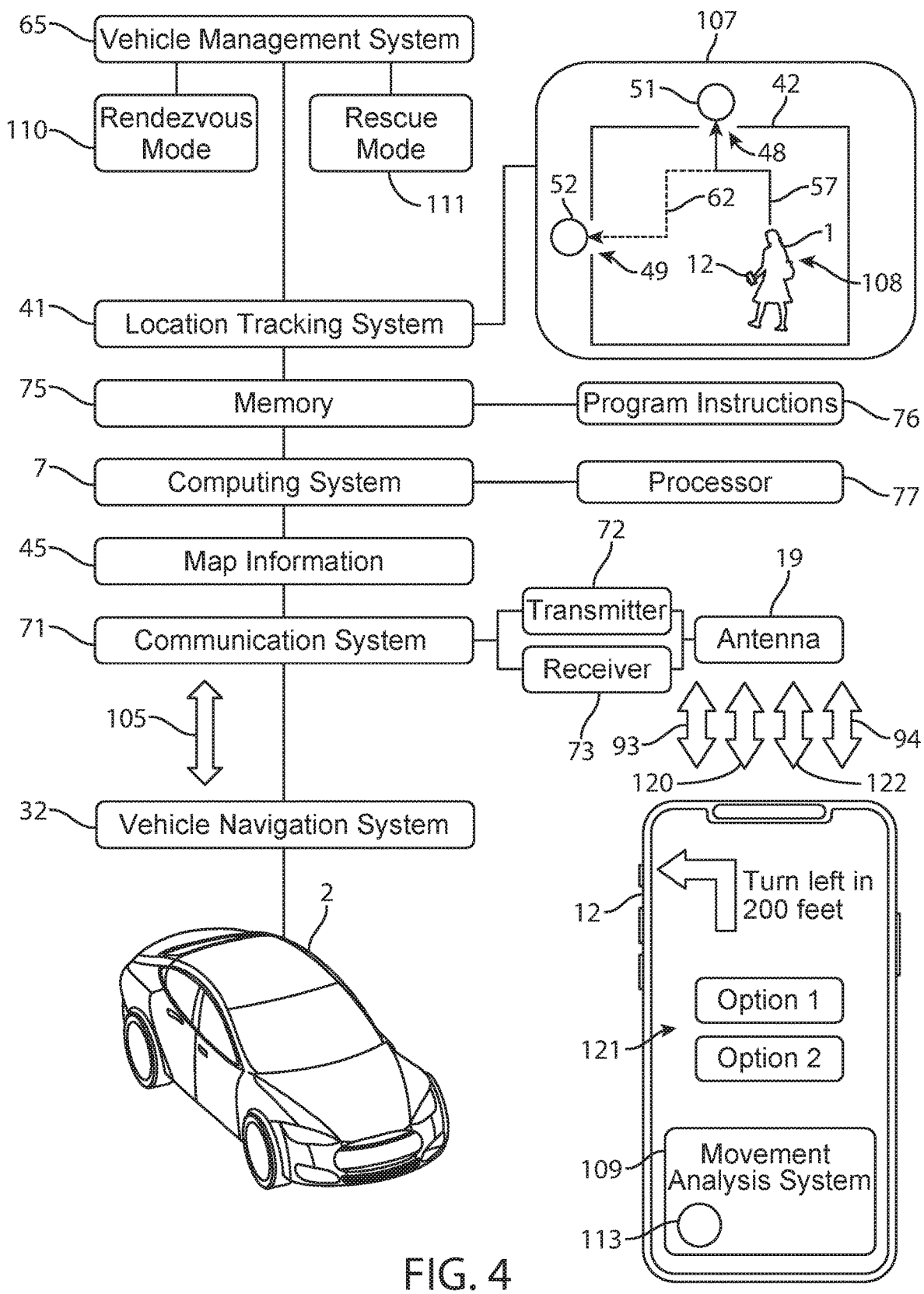
FIG. 4 illustrates a diagrammatic view that emphasizes certain portions of FIG. 1, according to some embodiments.

FIG. 4 illustrates a diagrammatic view that is similar to FIG. 1 except that certain features are emphasized. Some features are not shown in FIG. 4 in order to increase the clarity of the emphasized features. A location tracking system 41 is configured to track a location 108 of the first rider 1 (e.g., as the first rider 1 moves toward a pick-up location 51).

The remote computing device 12 can request GPS location data. This GPS location data can be sent to the location tracking system 41 to enable the location tracking system 41 to track the location of the rider 1.

The location tracking system 41 can comprise location data 107 that includes a location 108 of the first rider 1, information regarding interior walkways of a building 42, information regarding other walkways such as sidewalks and bridges, street maps, actual walking route information, alternative walking route information, actual driving route information, alternative driving route information, obstacle information, crowd information, and any other map and/or location information.

In some embodiments, a vehicle management system 65 comprises a vehicle 2 having a vehicle navigation system 32. The vehicle management system 65 can be configured to send a first pick-up location 51 to the vehicle navigation system 32. A communication system 71 can be configured to send the first pick-up location 51 to a remote computing device 12 of a first rider 1. The communication system 71 can send the first pick-up location 51 to the remote computing device 12 via intermediary communication systems 5 (illustrated in FIG. 1).

The communication system 71 can be configured to send a first wireless communication 93 to the remote computing device 12. The first wireless communication 93 can be configured to enable the remote computing device 12 to direct the first rider 1 toward the first pick-up location 51.

FIG. 4 illustrates a remote computing device 12 that has a display screen 121 configured to display directions (e.g., "Turn left in 200 feet") that direct the rider 1 to a pick-up location. The directions displayed on the display screen 121 can be updated in response to the pick-up location being changed. For example, if the rider takes a wrong turn while attempting to follow a first walking route 57, the vehicle management system 65 may decide to begin guiding the rider 1 along a second walking route 62 to a second pick-up location 52.

A pick-up location can be sent to the remote computing device 12 via any communication. In some embodiments, a pick-up location is sent via a wireless communication from the antenna 19 to the remote computing device 12 via intermediary communication system 5.

The first wireless communication 93 can comprise multiple wireless communications that together form the first wireless communication 93. Data security and the reliability of data transmission can justify using multiple wireless communications to create the first wireless communication 93.

The communication system 71 can be communicatively coupled to the vehicle navigation system 32 (e.g., via continuous communications or intermittent communications). The vehicle navigation system 32 can be coupled to the vehicle 2 and/or located inside the vehicle 2. The vehicle navigation system 32 can be located away from the vehicle 2. In some embodiments, a first portion of the vehicle navigation system 32 is coupled to the vehicle 2 and a second portion of the vehicle navigation system 32 is located away from the vehicle 2 (e.g., in the "Cloud").

In some embodiments, the vehicle management system 65 comprises a location tracking system 41 configured to monitor a location 108 of the first rider 1. The vehicle management system 65 can be configured to determine, based on the location 108 of the first rider 1, that the vehicle 2 could rendezvous with the first rider 1 faster by using a second pick-up location 52 located away from the first pick-up location 51.

If the rider 1 takes a wrong turn while walking to the first pick-up location 51, the second pick-up location might become a time-saving option. Using the location 108 of the first rider 1, the movement speed of the first rider 1, walking route information, traffic information, and driving route information, the vehicle management system 65 can calculate that the vehicle 2 could rendezvous with the first rider 1 at 1:43 PM at the second pick-up location 52 and could rendezvous with the first rider 1 at 1:51 PM at the first pick-up location 51.

Rendezvous means a rider and a vehicle meeting at a pick-up location. If a rider arrives at a pick-up location at 11:00 AM and a vehicle arrives at the pick-up location at 11:05 AM, then the rendezvous occurs at 11:05 AM. If a rider arrives at a pick-up location at 10:00 AM and a vehicle arrives at the pick-up location at 9:55 AM, then the rendezvous occurs at 10:00 AM.

The communication system 71 can be configured to send a second communication 105 to the vehicle navigation system 32. The second communication 105 can be configured to prompt the vehicle navigation system 32 to cease directing the vehicle 2 toward the first pick-up location 51 and instead direct the vehicle 2 toward the second pick-up location 52. The second communication 105 can comprise a series of communications.

In some embodiments, the communication system 71 is configured to send a third wireless communication 94 to the remote computing device 12. The third wireless communication 94 can be configured to prompt the remote computing device 12 to cease directing the first rider 1 toward the first pick-up location 51 and instead direct the first rider 1 toward the second pick-up location 52. The third wireless communication 94 can comprise a series of communications.

In some embodiments, the vehicle management system 65 comprises a location tracking system 41 configured to monitor a location 108 of the first rider 1. The communication system 71 can be configured to send a second wireless communication 120 to the remote computing device 12 in response to the location tracking system 41 determining that the first rider 1 is moving away from at least one of the first pick-up location 51 and a first walking route 57 to the first pick-up location 51. The second wireless communication 120 can be configured to prompt the remote computing device 12 to present an option for the first rider 1 to replace the first pick-up location 51 with the second pick-up location 52.

FIG. 4 illustrates a remote computing device 12 that has a display screen 121. The remote computing device 12 can run an "app" that presents icons indicating "Option 1" (e.g., a first pick-up location) and "Option 2" (e.g., a second pick-up location). The remote computing device 12 can present "Option 1" and "Option 2" in response to the location tracking system 41 determining that the first rider 1 is moving away from at least one of the first pick-up location 51 and a first walking route 57 (to the first pick-up location 51). A remote server can receive location data of the remote computing device 12 (e.g., via location data services provided by Apple Inc.). The location tracking system 41 can use the location data provided by Apple Inc. along with location data of the first walking route 57 and the first pick-up location 51 to identify that the first rider 1 is moving away from at least one of the first pick-up location 51 and a first walking route 57 to the first pick-up location 51.

When the user selects "Option 2," the app running on the remote computing device 12 can cease directing the rider 1 to the first pick-up location 51 and can start directing the rider 1 to the second pick-up location 52. The app can direct the rider to the second pick-up location 52 by displaying arrows and text that instruct the rider 1 which direction to turn and where to turn. The app can direct the rider to the second pick-up location 52 by displaying a map on the display screen 121 along with markers (e.g., dots or lines) on the map that show the rider 1 how to arrive at the second pick-up location 52.

The second wireless communication 120 can be configured to prompt the remote computing device 12 to present an option for the first rider 1 to replace the first pick-up location 51 with the second pick-up location 52. In some embodiments, the second wireless communication causes an app running on the remote computing device 12 to ask the rider 1 if she would like to select a different pick-up location. In response to the location tracking system 41 determining that the first rider 1 is moving away from at least one of the first pick-up location 51 and a first walking route 57 to the first pick-up location 51, the app can say, "I noticed you are no longer walking toward the pick-up location. Would you like to select a different pick-up location that is closer to your current location?"

In response to the location tracking system 41 determining that the first rider 1 is moving away from at least one of the first pick-up location 51 and a first walking route 57 to the first pick-up location 51, the app can say, "1020 Main Street is a closer pick-up location. Would you like to use that pick-up location instead?" If the user responds, "Yes," then the app can cease directing the rider 1 towards the first pick-up location and can begin directing the rider 1 to the 1020 Main Street pick-up location. The user can respond by touching an icon on the display screen 121 and/or by talking (which can be heard by a microphone of the remote computing device 12).

Various embodiments use many different types of icons, processes, and words to present an option for the first rider 1 to replace a first pick-up location 51 with a second pick-up location 52 in response to the location tracking system 41 determining that the first rider 1 is moving away from at least one of the first pick-up location 51 and a first walking route 57 to the first pick-up location 51.

In some embodiments, the vehicle management system 65 controls the app on the remote computing device 12 and also controls the vehicle navigation system 32.

In some embodiments, the vehicle management system 65 provides prompts to the app on the remote computing device 12 and also provides prompts to the vehicle navigation system 32. The prompts can be configured to request that the app perform certain actions (such as updating a pick-up location).

In several embodiments, the second wireless communication 120 can be configured to prompt the remote computing device 12 to replace the first pick-up location 51 with the second pick-up location 52. The second pick-up location 52 can be located closer than the first pick-up location 51 to the present location 108 of the first rider 1.

In many situations, the rider will be able to walk to a pick-up location. Rendezvous mode (of the vehicle management system 65) can be used to direct both the vehicle 2 and the rider 1 toward a pick-up location. In other situations, however, the rider might not be able to walk toward the pick-up location. In some embodiments, the vehicle management system 65 detects that the rider appears to be lost and responds by entering rescue mode.

In some embodiments, the vehicle management system 65 comprises a rendezvous mode 110 in which the vehicle management system 65 is configured to direct both the vehicle 2 and the first rider 1 toward the first pick-up location 51.

The vehicle management system 65 can direct the first rider 1 toward the first pick-up location 51 by sending a wireless communication to a remote computing device 12 of the first rider 1. The wireless communication being configured to prompt the remote computing device 12 to give turn by turn directions or route guidance on a map to the first rider 1.

In some embodiments, the vehicle management system 65 comprises a rescue mode 111 in which the vehicle management system 65 is configured to direct the vehicle 2 toward a location 108 of the first rider 1 and is configured to prompt the first rider 1 to remain at the location 108 of the first rider 1.

The vehicle management system 65 can prompt the first rider 1 by sending a wireless communication to a remote computing device 12 of the first rider 1. The wireless communication can be configured to enable the remote computing device 12 to provide instructions to the first rider 1.

In some embodiments, the vehicle management system 65 comprises a location tracking system 41 configured to monitor the location 108 of the first rider 1. The location tracking system 41 can track a rider's location by getting satellite data directly from satellites or by receiving GPS data indirectly from another device (e.g., a smartphone) that received the GPS data from satellites or other position data providers.

In some embodiments, the vehicle management system 65 is configured to exit the rendezvous mode 110 and enter the rescue mode 111 in response to determining, by the location tracking system 41, that the first rider 1 is moving away from at least one of the first pick-up location 51 and a first walking route 57 to the first pick-up location 51.

Health conditions such as Sciatica can strike with little warning. Sciatica is pain that radiates along the path of the sciatic nerve, which branches from your lower back through your hips and down each leg. Sciatica can make walking difficult. Many other conditions such as dizziness, ankle sprains, and intoxication can make walking difficult. A rider who is normally able to walk substantial distances to a first pick-up location 51 may unexpectedly have difficulty walking, and thus need a closer pick-up location.

Although diagnosing sciatica and other conditions that impede walking can be challenging, some vehicle-management-system embodiments detect the symptoms of walking difficulty and take alleviating actions.

In some embodiments, the vehicle management system 65 comprises a location tracking system 41 configured to monitor a location 108 of the first rider 1. The location tracking system 41 can be configured to analyze a walking speed of the first rider 1.

Some embodiments analyze walking speed by measuring the distance between location data points and then using the time between location data points to estimate the walking speed.

Some embodiments include an accelerometer system (which can include accelerometers in the X, Y, and Z axes) to measure movement indicators. The accelerometer system can be located in the remote computing device 12. iPhone and Apple Watch include suitable accelerometer systems that can calculate speed.

The vehicle management system 65 can be configured to suggest a second pick-up location 52 located away from the first pick-up location 51 and located closer than the first pick-up location 51 to the present location 108 of the first rider 1 in response to determining that the walking speed is below a predetermined threshold.

Systems can balance vehicle-related factors (e.g., vehicle idle time, vehicle use time, fuel expenses, parking costs) and rider-related factors (e.g., saving the rider time, convenience of a preferred pick-up time, riding with other passengers). In some cases, the vehicle management system 65 can provide a lower ride price to the rider 1 if the rider 1 is willing (and able) to walk to a distant pick-up location. Even without asking the rider 1 if she is willing to walk to a distant pick-up location, the vehicle management system 65 might choose a distant pick-up location. If the rider 1 is walking slowly, the balance calculations can show a different optimal pick-up location (e.g., because the rider 1 would not arrive at the pick-up location as soon as expected or because forcing the rider 1 to walk too far might present a health challenge to the rider 1). The different optimal pick-up location could be closer to the rider 1. The different optimal pick-up location might require the vehicle 2 to incur additional parking fees, fuel fees, or travel time.

The predetermined threshold can be any type of suitable threshold. The threshold can be a speed measured in meters per second or any other suitable units of measurement.

In some embodiments, the communication system 71 is configured to send a second wireless communication 120 to the remote computing device 12 in response to vehicle management system 65 determining that the walking speed is below the predetermined threshold. The second wireless communication 120 can be configured to prompt the remote computing device 12 to present an option for the first rider 1 to replace the first pick-up location 51 with the second pick-up location 52. In several embodiments, the second wireless communication 120 is configured to prompt the remote computing device 12 to cease guiding the first rider 1 to the first pick-up location 51 and instead guide the first rider 1 to the second pick-up location 52.

In some embodiments, the vehicle management system 65 comprises a location tracking system 41 configured to monitor a location 108 of the first rider 1. The location tracking system 41 can be configured to analyze a movement speed of the first rider 1 (e.g., as the rider moves towards the first pick-up location 51). The communication system 71 can be configured to send a second wireless communication 120 to the remote computing device 12 in response to the location tracking system 41 determining that the movement speed is below a predetermined threshold. The second wireless communication 120 can be configured to prompt the remote computing device 12 to present an option for the first rider 1 to replace the first pick-up location 51 with a second pick-up location 52 located closer than the first pick-up location 51 to the present location 108 of the first rider 1. In several embodiments, the second wireless communication 120 is configured to prompt the remote computing device 12 to guide the first rider 1 toward the second pick-up location 52.

In some embodiments, the vehicle management system 65 comprises a remote computing device 12 that has a movement analysis system 109 configured to monitor movement of the first rider 1. The remote computing device 12 can be configured to present an option, in response to the movement analysis system 109 determining that the movement is below a predetermined threshold, for the first rider 1 to replace the first pick-up location 51 with a second pick-up location 52 located closer than the first pick-up location 51 to a location 108 of the first rider 1.

The movement analysis system 109 can comprise accelerometers 113 (e.g., such as the accelerometers in Android phones, iPhones, and/or Apple Watches) to measure movements of the first rider 1. In some embodiments, the accelerometer 113 comprises a multi-axis accelerometer configured to detect magnitudes and directions of accelerations to enable the system to determine in which direction the first rider 1 is walking. The system can calibrate the accelerometer based on detecting the force of gravity (and then defining that direction as "downward"). Additional accelerations (e.g., perpendicular to the direction of gravity) can be analyzed (e.g., using simple calculus) to convert accelerations into velocity to enable the system to determine a walking speed of the first rider 1.

The downward direction can be used to enable the system to determine the orientation of the accelerometer 113. The forward direction is perpendicular to the downward direction. This methodology can enable the system to identify forward accelerations (i.e., accelerations in the direction of travel as the first rider 1 walks).

Forward velocity equals starting forward velocity plus forward acceleration multiplied by time. Movements of the first rider 1 can be analyzed over very small time increments (e.g., 0.001 seconds) to enable forward velocity to be determined over each small time increment. The distance traveled in each small time increment can be estimated by 0.5*Time*(velocity at the beginning+velocity at the end).

The system can also analyze acceleration data from the accelerometers 113 to analyze a waiting gait of the first rider 1. For example, the remote computing device 12 can be located in a pocket of the first rider 1. The movements of the first rider 1 (as the first rider 1 walks with the remote computing device 12 in her pocket or as she otherwise carries the remote computing device 12) cause accelerations that can be measured by the accelerometer 113. These accelerations can be graphed to analyze the gait of the first rider 1. The downward direction can be determined by identifying the force of gravity. This downward direction can be used to enable the system to determine the orientation of the accelerometer 113. The upward direction is opposite the downward direction. The forward direction is perpendicular to the downward direction. Knowing the upward and forward directions enables the system to construct a reasonably accurate gait analysis that can be used to determine how quickly the first rider 1 is walking and if the first rider 1 is walking with a limp or other impairment. If the first rider 1 is walking with a limp or other impairment (as indicated by the gait analysis), then the program instructions can be configured to suggest closer pick-up locations than the program instructions would suggest absent the limp or other impairment.

The gait analysis can be compared to previous gait analyses for that particular rider to determine if the rider is less able to walk to distant pick-up locations (than the rider would be on a typical day).

The gain analysis can be compared to gait analyses of other people and/or of an average person to determine if the first rider 1 is more or less able to walk to distant pick-up locations. A first rider 1 with particularly quick walking speeds (and/or who does not have any walking impairments) may be recommended distant pick-up locations (e.g., so the first rider 1 can meet other riders at a group pick-up location). A first rider 1 with particularly slow walking speeds might be recommended a close, individual pick-up location (rather than having to walk farther to a group pick-up location).

The movement analysis system 109 can use GPS data received from satellites (e.g., via intermediary communication networks 5) to monitor the movement of the first rider 1. For example, Apple Inc. provides GPS data to iPhones.

In some embodiments, the remote computing device 12 is configured to replace, in response to the movement analysis system 109 determining that the movement is below a predetermined threshold, the first pick-up location 51 with a second pick-up location 52 located closer than the first pick-up location 51 to a present location 108 of the first rider 1. The remote computing device 12 can be configured to send, in response to the movement analysis system 109 determining that the movement is below a predetermined threshold, a wireless communication 122 to the vehicle navigation system 32. The wireless communication 122 can be configured to prompt the vehicle navigation system 32 to navigate the vehicle 2 to the second pick-up location 52 (rather than to the first pick-up location 51).

Some embodiments comprise receiving, by the vehicle management system 65, a first pick-up location 51 for a first rider 1; directing, by the vehicle management system 65, a vehicle 2 to move toward the first pick-up location 51 by following a first driving route 58; and/or directing, by the vehicle management system 65, the first rider 1 to move toward the first pick-up location 51 by following a first walking route 57.

In some embodiments, the first walking route is replaced by a first commuting route. The rider can use any means (e.g., cars, buses, helicopters, planes, trains, skateboards, motorcycles, electric scooters, bicycles, any other transportation means) to move along the first commuting route to arrive at the pick-up location.

Some embodiments comprise (after directing the vehicle 2 and the first rider 1 toward the first pick-up location 51) monitoring, by the vehicle management system 65, a location 108 of the first rider 1; determining, by the vehicle management system 65, that the vehicle 2 could rendezvous with the first rider 1 faster by using a second pick-up location 52 located away from the first pick-up location 51; directing, by the vehicle management system 65, the vehicle 2 to move toward the second pick-up location 52 by following a second driving route 60; and/or directing, by the vehicle management system 65, the first rider 1 to move toward the second pick-up location 52 by following a second walking route 62.

The vehicle management system 65 can direct the first rider 1 to move toward the second pick-up location 52 (by following a second walking route 62) by sending information to the remote computing device 12 that enables the remote computing device 12 to guide the rider 1 toward the second pick-up location 52. This information could be a location of the second pick-up location 52. This information could be a communication that comprises the location of the second pick-up location 52 and comprises a request for the remote computing device 12 to guide the rider 1 toward the second pick-up location 52. The information can be configured to be interpreted by an app running on the remote computing device 12.

Some embodiments comprise (in response to determining that the vehicle 2 could rendezvous with the first rider 1 faster by using the second pick-up location 52) prompting, by the vehicle management system 65, the first rider 1 to replace the first pick-up location 51 with the second pick-up location 52.

The vehicle management system 65 can prompt the first rider 1 to replace the first pick-up location 51 with the second pick-up location 52 by sending a communication to the remote computing device 12, wherein the communication is configured to request that the remote computing device (e.g., via an app) ask the rider 1 if she would like to select a pick-up location that is different than the first pick-up location 51.

Some embodiments comprise (after directing the vehicle 2 and the first rider 1 toward the first pick-up location 51) monitoring, by the vehicle management system 65, a location 108 of the first rider 1, and/or prompting, by the vehicle management system 65, the first rider 1 to replace the first pick-up location 51 with a second pick-up location 52 in response to determining that the first rider 1 is moving away from at least one of the first pick-up location 51 and the first walking route 57.

Some embodiments comprise directing, by the vehicle management system 65, the vehicle 2 to move toward the second pick-up location 52 by following a second driving route 60, and/or directing, by the vehicle management system 65, (e.g., via communications to an app on the remote computing device 12) the first rider 1 to move toward the second pick-up location 52 by following a second walking route 62. The second pick-up location 52 can be located closer than the first pick-up location 51 to the location 108 of the first rider 1 (e.g., during prompting, by the vehicle management system 65, the first rider 1 to replace the first pick-up location 51 with a second pick-up location 52).

In some embodiments, the vehicle management system 65 comprises a rendezvous mode 110 in which the vehicle management system 65 directs both the vehicle 2 and the first rider 1 toward the first pick-up location 51. The vehicle management system 65 can comprise a rescue mode 111 in which the vehicle management system 65 directs the vehicle 2 toward a location 108 of the first rider 1 and prompts the first rider 1 to remain at the location 108 of the first rider 1.

Embodiments can comprise (after entering the rendezvous mode 110 and directing the vehicle 2 and the first rider 1 toward the first pick-up location 51) monitoring, by the vehicle management system 65, the location 108 of the first rider 1; and/or exiting the rendezvous mode 110 and entering the rescue mode 111 in response to determining that the first rider 1 is moving away from at least one of the first pick-up location 51 and the first walking route 57.

A second pick-up location 52 can be better suited (for the rider 1) than a first pick-up location 51 because the second pick-up location 52 will save time or money. A second pick-up location 52 can be better suited (for the rider 1) than a first pick-up location 51 because the second pick-up location 52 is a better match with preferences of the rider 1. The preferences can be recorded in an Account 81 of the rider 1.

Some embodiments comprise (after directing the vehicle 2 and the first rider 1 toward the first pick-up location 51) determining, by the vehicle management system 65, that a second pick-up location 52 located away from the first pick-up location 51 is better suited to picking up the first rider 1; directing, by the vehicle management system 65, (e.g., via communications from the vehicle management system 65 to the vehicle navigation system 32) the vehicle 2 to move toward the second pick-up location 52 by following a second driving route 60; and/or directing, by the vehicle management system 65, (e.g., via communications from the vehicle management system 65 to an app on the remote computing device 12) the first rider 1 to move toward the second pick-up location 52 by following a second walking route 62.

In some embodiments, determining that the second pick-up location 52 is better suited (than the first pick-up location 51) comprises determining that the first rider 1 has moved away from the first walking route 57. The location tracking system 41 can analyze location data 107 to determine that the rider 1 has moved away from the first walking route 57. The vehicle management system 65 can determine that the first rider 1 has moved away from the first walking route 57 by receiving data from the location tracking system 41.

In some embodiments, determining that the second pick-up location 52 is better suited comprises analyzing a movement speed of the first rider 1 (e.g., as the first rider 1 moves toward the second pick-up location 52); estimating a first arrival time of the first rider 1 at the first pick-up location 51 based on the movement speed; and/or estimating a second arrival time of the first rider 1 at the second pick-up location 52 based on the movement speed. In several embodiments, determining that the second pick-up location 52 is better suited comprises determining that the second arrival time is sooner than the first arrival time.

In some embodiments, determining that the second pick-up location 52 is better suited comprises identifying the second pick-up location 52; estimating a first time until the vehicle 2 would arrive at the first pick-up location 51; estimating a second time until the first rider 1 would arrive at the first pick-up location 51; estimating a third time until the vehicle 2 would arrive at the second pick-up location 52; estimating a fourth time until the first rider 1 would arrive at the second pick-up location 52; and/or determining that the greater of the first time and the second time is greater than the greater of the third time and the fourth time.

In several embodiments, determining that the second pick-up location 52 is better suited comprises determining that the greater of the first time and the second time is at least 10 percent greater than the greater of the third time and the fourth time. In several embodiments, determining that the second pick-up location 52 is better suited comprises determining that the greater of the first time and the second time is at least 20 percent greater than the greater of the third time and the fourth time. In several embodiments, determining that the second pick-up location 52 is better suited comprises determining that the greater of the first time and/or the second time is greater than the greater of the third time and/or the fourth time.

In some cases, the vehicle management system 65 (e.g., by analyzing data from the location tracking system 41) will determine that the rider 1 is no longer walking or is walking in the wrong direction. The vehicle management system 65 can alleviate the situation by choosing a second pick-up location 52 (that is located away from the first pick-up location 51 and located closer than the first pick-up location 51 to a present location 108 of the first rider 1).

Some embodiments comprise (after directing the vehicle 2 and the first rider 1 toward the first pick-up location 51) choosing, by the vehicle management system 65, a second pick-up location 52 located away from the first pick-up location 51 and located closer than the first pick-up location 51 to a present location 108 of the first rider 1 in response to determining, by the vehicle management system 65, that the first rider 1 is no longer advancing toward the first pick-up location 51.

In some embodiments, the vehicle management system 65 causes an app running on the remote computing device 12 (or causes other software running on the remote computing device 12) to suggest that the rider 1 can choose a different pick-up location (after the rider is already moving toward the first pick-up location 51).

In some embodiments, the vehicle management system 65 chooses a different pick-up location (after the rider is already moving toward the first pick-up location 51), and then notifies (via a communication) the remote computing device 12 of the updated pick-up location (e.g., the second pick-up location 52). The notification from the vehicle management system 65 to the remote computing device 12 is configured to request that the remote computing device 12 begin guiding the rider 1 toward the second pick-up location 52 (rather than continue to direct the rider 1 toward the first pick-up location 51).

In some embodiments, the second pick-up location 52 is within a predetermined distance of the location 108 of the first rider 1. The predetermined distance can be 100 feet, 250 feet, 950 feet, and/or any suitable distance. Some methods comprise directing, by the vehicle management system 65, the vehicle 2 to move toward the second pick-up location 52 by following a second driving route 60.

Some embodiments comprise analyzing a database of previous pick-up spots to select the second pick-up location 52. Certain locations make rendezvousing with the rider 1 easier than is the case with other locations. For example, a street may have a lot of traffic and may not have a sidewalk, which could make the rendezvous dangerous. Other potential pick-up locations may be located in a private parking garage or private parking lot that requires entry authorization or an entry fee.

The memory 75 can include a database of previous pick-up spots that worked well in the past (e.g., riders in the past chose the pick-up locations, riders gave the pick-up spots high ratings, vehicles did not encounter obstacles to picking up riders).

An Apple Watch and an iPhone (made by Apple Inc.) include accelerometer systems that can analyze a walking speed of the first rider 1. The location tracking system 41 can analyze the walking speed of the first rider 1 by receiving data from the remote computing device. The location tracking system 41 can analyze the walking speed of the first rider 1 by analyzing GPS information (e.g., GPS location points and times of the rider 1 as the rider walks). The location tracking system 41 can analyze the walking speed of the first rider 1 by receiving walking speed data generated by another device that analyzed GPS information (e.g., GPS location points and times of the rider 1 as the rider walks).

Some embodiments comprise (after directing the vehicle 2 and the first rider 1 toward the first pick-up location 51) analyzing, by a location tracking system 41, a walking speed of the first rider 1. Some embodiments comprise choosing, by the vehicle management system 65, a second pick-up location 52 located away from the first pick-up location 51 and located closer than the first pick-up location 51 to a location 108 of the first rider 1 in response to determining, by the vehicle management system 65, that the walking speed is below a predetermined threshold.

The entire contents of the following patent application are incorporated by reference here: U.S. patent application Ser. No. 16/205,013.

Some embodiments increase the attractiveness of using self-driving vehicles by providing more convenient or less expensive pick-up locations based on the movement abilities of the particular rider. If a rider has difficulty walking, a closer (but perhaps more expensive) pick-up location can be recommended to the rider. If a rider is able to walk quickly (e.g., can walk faster than an average rider can walk), a farther (but less expensive) pick-up location can be recommended to the rider.

In some embodiments, a vehicle management system 65 comprises a vehicle 2 having a vehicle navigation system 32. The vehicle management system 65 can comprise program instructions 76 configured to send a first pick-up location to the vehicle navigation system 32. The vehicle management system 65 can comprise a communication system 71 configured to send the first pick-up location to a remote computing device 12 of a first rider 1. The communication system 71 can be configured to send a first wireless communication to the remote computing device 12. The first wireless communication can be configured to enable the remote computing device 12 to direct the first rider 1 toward the first pick-up location.

In some embodiments, a vehicle management system 65 comprises a location tracking system 41 configured to monitor a location of the remote computing device 12 of the first rider 1. The communication system 71 can be configured to send a second wireless communication to the remote computing device 12 in response to the location tracking system 41 determining that the remote computing device 12 of the first rider 1 is moving away from a first walking route to the first pick-up location. The second wireless communication can be configured to prompt the remote computing device 12 to present an option for the first rider 1 to replace the first pick-up location with the second pick-up location.

In some embodiments, the second pick-up location is located closer than the first pick-up location to the location of the remote computing device 12 of first rider 1.

In some embodiments, vehicle management system 65 comprises program instructions 76 that have a rendezvous mode 110 in which the vehicle management system 65 is configured to direct both the vehicle 2 and the first rider 1 toward the first pick-up location. The vehicle management system 65 can comprise program instructions 76 that have a rescue mode 111 in which the vehicle management system 65 is configured to direct the vehicle 2 toward a location of the remote computing device 12 of the first rider 1.

The vehicle management system 65 can further comprise a location tracking system 41 configured to monitor the location of the remote computing device 12 of the first rider 1. The vehicle management system 65 can be configured to exit the rendezvous mode 110 and enter the rescue mode 111 in response to determining, by the location tracking system 41, that the first rider 1 is moving away from a first walking route that leads to the first pick-up location.

In some embodiments, the system detects that the rider is not moving or perhaps just not moving enough to indicate walking. The rider might be standing around or sitting while waiting for a vehicle to come pick her up. The location where the rider is waiting, however, might not be the pick-up location to which the vehicle is going.

The vehicle management system 65 can comprise the remote computing device 12 having an accelerometer 113 configured to monitor accelerations of the remote computing device 12 as the first rider 1 carries the remote computing device 12. A location tracking system 41 can be configured to monitor a location of the remote computing device 12 of the first rider 1. Program instructions can be configured to analyze movements of the first rider 1 by analyzing the accelerations. (In some embodiments, the movements are within plus or minus twenty degrees of perpendicular to the "downward" direction of gravity such that the movements are indicative of how quickly the first rider 1 is walking.)

The program instructions can be configured to cease directing the vehicle 2 toward the first pick-up location and instead direct the vehicle 2 to the location of the remote computing device 12 of the first rider 1 in response to determining that the accelerations are indicative of the movements being less than a predetermined threshold.

In some embodiments, the predetermined threshold is chosen such that accelerations above the predetermined threshold are typically not achieved unless the rider is walking and accelerations below the predetermined threshold are typical of a rider standing or sitting.

As used herein, walking can include all means of moving "on foot" and can include running. In some cases, the rider uses wheeled transportation to move along a walking route (e.g., to go to a pick-up location to meet up with a vehicle 2). The rider may ride a bike or scooter along a walking route to meet up with a vehicle 2 at a pick-up location.

In some cases, the first rider 1 might not be moving toward the pick-up location simply because the first rider 1 is not expecting a ride until a later time. If a scheduled pick-up time has passed and/or is within ten minutes, however, the first rider 1 not walking toward the scheduled pick-up location is more problematic.

The program instructions can be configured to cease directing the vehicle 2 toward the first pick-up location and instead direct the vehicle 2 to the location of the remote computing device 12 of the first rider 1 in response to determining that the accelerations are indicative of the movements being less than the predetermined threshold and in response to determining that a previously scheduled pick-up time for the first rider 1 has passed.

In some cases, the first rider 1 may shuffle her feet and perhaps even approximately walk in circles (while waiting for a ride) without making any substantial progress in the direction of a pick-up location (e.g., the rider does not move more than 100 feet toward the pick-up location during a predetermined amount of time).

In some embodiments, the vehicle management system 65 comprises a location tracking system 41 configured to monitor a location of the remote computing device 12 of the first rider 1; the remote computing device 12 having an accelerometer 113 configured to monitor accelerations of the first rider 1 as the first rider 1 carries the remote computing device 12; and program instructions 76 configured to analyze movements of the first rider 1 by analyzing the accelerations. The program instructions 76 can be configured to cease directing the vehicle 2 toward the first pick-up location and instead direct the vehicle 2 to the location of the remote computing device 12 of the first rider 1 in response to determining that the accelerations are indicative of the first rider 1 moving less than a predetermined distance during a predetermined time. In some embodiments, the predetermined distance can be ten yards, 30 yards, and/or 100 yards. In some embodiments, the predetermined time can be greater than twenty seconds, greater than one minute, less than five minutes, and/or less than thirty minutes.

The program instructions can be configured to cease directing the vehicle 2 toward the first pick-up location and instead direct the vehicle 2 to the location of the remote computing device 12 of the first rider 1 in response to determining that the accelerations are indicative of the first rider 1 moving less than the predetermined distance during the predetermined time and in response to determining that a previously scheduled pick-up time for the first rider 1 is at least one of passed, within five minutes, within fifteen minutes, and within thirty minutes.

Some embodiments are directed to updating a pick-up location. Some embodiments are directed to choosing an original pick-up location (rather than updating a pick-up location). Embodiments can suggest several options for an original pick-up location. The suggested locations can be chosen based on data regarding the walking ability of the rider. A rider with high walking ability may receive pick-up location suggestions that are farther away than a rider with low walking ability may receive. The system can create a walking profile for each rider based on each rider's preferences and/or based on data collected (e.g., via GPS and/or accelerometers) regarding the rider's current and/or past walking.

In some embodiments, a vehicle management system 65 comprises a location tracking system 41 having program instructions 76 configured to monitor a movement speed of the remote computing device 12 of the first rider 1 as the first rider 1 walks. GPS data from the remote computing device 12 can enable the location tracking system 41 to monitor the movement speed of the remote computing device 12. Accelerometer data (e.g., from the accelerometer 113) can enable the location tracking system 41 to monitor the movement speed of the remote computing device 12.

The vehicle management system 65 can comprise a memory 75 comprising the first pick-up location and a second pick-up location. Program instructions can be configured to suggest the first pick-up location rather than the second pick-up location in response to analyzing the movement speed.

If a rider walks quickly, the system may recommend a farther pick-up location (that may have cost or other advantages over a close pick-up location).

The location tracking system 41 can be configured to monitor a location of the remote computing device 12 of the first rider 1. Program instructions 76 can be configured to suggest the first pick-up location rather than the second pick-up location in response to determining that the first pick-up location is located farther than the second pick-up location from the location of the remote computing device 12 and in response to determining that the movement speed is greater than a predetermined threshold.

If a rider walks slowly, the system may recommend a closer pick-up location (that may be more convenient for a slow walker).

The location tracking system 41 can be configured to monitor a location of the remote computing device 12 of the first rider 1. Program instructions 76 can be configured to suggest the first pick-up location rather than the second pick-up location in response to determining that the first pick-up location is located closer than the second pick-up location to the location of the remote computing device 12 and in response to determining that the movement speed is less than a predetermined threshold.

The system can take in account past walking speeds of the first rider 1. The past walking behavior can be used to create a profile for the first rider 1.

A location tracking system 41 can have program instructions 76 configured to monitor movement speeds of the remote computing device 12 of the first rider 1 as the first rider 1 walks. The vehicle management system 65 can comprise a memory 75 comprising the first pick-up location, a second pick-up location, and a profile indicative of the movement speeds on at least two previous days. (For example, if today is Friday, the profile can be based on how quickly the rider walked on the previous Monday and Wednesday.) The program instructions can be configured to suggest the first pick-up location rather than the second pick-up location in response to analyzing the profile. A memory 75 can comprise the profile indicative of the movement speeds on previous days.

In some embodiments, the location tracking system 41 is configured to monitor a location of the remote computing device 12 of the first rider 1. The program instructions can be configured to suggest the first pick-up location rather than the second pick-up location in response to determining that the first pick-up location is located farther than the second pick-up location from the location of the remote computing device 12 and in response to determining that the profile indicates a walking ability that is greater than a predetermined threshold.

In some embodiments, an accelerometer 113 of the remote computing device 12 (carried by the first rider 1) is used to analyze the walking behavior of the first rider 1.

The vehicle management system 65 can comprise a remote computing device 12 configured to be carried by the first rider 1. The remote computing device 12 can have an accelerometer 113 configured to monitor accelerations of the first rider 1 as the first rider 1 walks.

The vehicle management system 65 can comprise a memory 75 that includes the first pick-up location and a second pick-up location (and can also include many other pick-up locations). The vehicle management system 65 can comprise program instructions 76 configured to suggest the first pick-up location rather than the second pick-up location in response to analyzing the accelerations. Accelerations indicative of a person who can walking quickly can cause the program instructions 76 to suggest more distant pick-up locations than accelerations indicative of a person who does not walk quickly.

In some embodiments, program instructions are configured to analyze the accelerations to determine a movement speed of the first rider 1. The program instructions can be configured to suggest the first pick-up location rather than the second pick-up location in response to determining that the first pick-up location is located farther than the second pick-up location from the location of the remote computing device 12 and in response to determining that the movement speed is greater than a predetermined threshold.

The program instructions can be configured to suggest the first pick-up location rather than the second pick-up location in response to determining that the first pick-up location is located closer than the second pick-up location from the location of the remote computing device 12 and in response to determining that the movement speed is less than a predetermined threshold.

In some embodiments, the vehicle management system 65 comprises a remote computing device 12 configured to be carried by the first rider 1. The remote computing device can comprise an accelerometer 113 configured to detect accelerations of the first rider 1 as the first rider 1 walks. At least one of the vehicle management system 65 and the remote computing device 12 can comprise program instructions configured to analyze the accelerations to analyze a gait of the first rider 1 as the first rider 1 walks. The program instructions can be configured to suggest the first pick-up location rather than a second pick-up location (that is located farther away from the remote computing device 12) in response to analyzing the gait.

Some embodiments comprise receiving, by the vehicle management system 65, a first pick-up location for a first rider 1; directing, by the vehicle management system 65, a vehicle 2 to move toward the first pick-up location by following a first driving route; and/or directing, by the vehicle management system 65, the first rider 1 to move toward the first pick-up location by following a first walking route.

Some embodiments comprise, after directing the vehicle 2 and the first rider 1 toward the first pick-up location: monitoring, by the vehicle management system 65, a location of the first rider 1; determining, by the vehicle management system 65 based on monitoring the location of the first rider 1, that the first rider 1 is moving away from the first walking route; and/or suggesting, by the vehicle management system 65, a second pick-up location to replace the first pick-up location in response to determining that the first rider 1 is moving away from the first walking route.

In some embodiments, the second pick-up location is located closer than the first pick-up location to the location of the first rider 1 during the suggesting. Embodiments can comprise directing, by the vehicle management system 65, the vehicle 2 to move toward the second pick-up location by following a second driving route.

Some embodiments comprise, in response to determining that the first rider 1 is moving away from the first walking route and in response to suggesting the second pick-up location: receiving, by the vehicle management system 65 from the first rider 1, an acceptance of the second pick-up location; directing, by the vehicle management system 65, the vehicle 2 to move toward the second pick-up location by following a second driving route; and/or directing, by the vehicle management system 65, the first rider 1 to move toward the second pick-up location by following a second walking route.

In some embodiments, the vehicle management system 65 comprises a rendezvous mode 110 in which the vehicle management system 65 directs both the vehicle 2 and the first rider 1 toward the first pick-up location. The vehicle management system 65 can comprise a rescue mode 111 in which the vehicle management system 65 directs the vehicle 2 toward a location of the first rider 1 and/or prompts the first rider 1 to remain at the location of the first rider 1.

Some embodiments comprise, after entering the rendezvous mode 110 and directing the vehicle 2 and the first rider 1 toward the first pick-up location: monitoring, by the vehicle management system 65, the location of the first rider 1; and/or exiting the rendezvous mode 110 and entering the rescue mode 111 in response to determining that the first rider 1 is moving away from the first walking route.

Some embodiments comprise, after directing the vehicle 2 and the first rider 1 toward the first pick-up location, determining that the first rider 1 has moved away from the first walking route, and in response to the determining: automatically directing, by the vehicle management system 65, the vehicle 2 to move toward a second pick-up location by following a second driving route; and/or automatically directing, by the vehicle management system 65, the first rider 1 to move toward the second pick-up location by following a second walking route.

Some embodiments comprise, after directing the vehicle 2 and the first rider 1 toward the first pick-up location: directing, by the vehicle management system 65, the vehicle 2 to a second pick-up location located away from the first pick-up location and located closer than the first pick-up location to a location of the first rider 1 in response to determining, by the vehicle management system 65, that the first rider 1 has been inside an area for more than a predetermined time and in response to determining, by the vehicle management system 65, that a pick-up time has passed and/or is within twenty minutes. In some embodiments, the area is located away from the first pick-up location and is less than at least one of 100 feet in diameter, 100 feet wide, and 100 feet long.

If the rider has not left a small area and the pick-up time has passed (and/or is within twenty minutes), it is likely that the rider is waiting for a ride. The width and length of the area can be defined by GPS coordinates (e.g., along the surface of the earth). In some cases, the area is a circle with a diameter.

In some embodiments, the second pick-up location is within a predetermined distance of the location of the first rider 1.

Some embodiments comprise directing, by the vehicle management system 65, the vehicle 2 to move toward the second pick-up location by following a second driving route.

Some embodiments comprise, after directing the vehicle 2 and the first rider 1 toward the first pick-up location: analyzing, by an accelerometer 113 of a remote computing device 12 of the first rider 1, a first movement speed of the first rider 1; and/or choosing, by the vehicle management system 65, a second pick-up location located away from the first pick-up location and located closer than the first pick-up location to a location of the remote computing device 12 of the first rider 1 in response to determining, by the vehicle management system 65, that the first movement speed is below a predetermined threshold.

Some embodiments comprise, after directing the vehicle 2 and the first rider 1 toward the first pick-up location: determining, by the vehicle management system 65, a location of a remote computing device 12 of the first rider 1; analyzing, by an accelerometer 113 of the remote computing device 12 of the first rider 1, a first gait of the first rider 1; and/or choosing, by the vehicle management system 65, a second pick-up location located closer than the first pick-up location to the location of the remote computing device 12 in response to analyzing the first gait.

Some embodiments comprise comparing, by the vehicle management system 65, the first gait to a movement profile of the first rider 1; and/or directing, by the vehicle management system 65, the vehicle 2 to the second pick-up location in response to the comparing.

Comparing can indicate that the first gait is inconsistent with a typical gait of the first rider 1 as shown in the movement profile. The movement profile can also be built based on data from people of the same height, weight, gender, etc. and/or can be based on actual accelerometer 113 measurements taken as the first rider 1 walked in the past (e.g., to past pick-up locations).

Some embodiments comprise directing, by the vehicle management system 65, the vehicle 2 to the second pick-up location in response to determining, by the vehicle management system 65, that the first gait comprises at least one characteristic (and/or at least one acceleration attribute) that is at least one of below a first predetermined threshold and above a second predetermined threshold.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

The self-driving vehicle 2 can be any suitable vehicle. For example, the self-driving vehicle 2 can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle 2 can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real world driving data. In some embodiments, self-driving vehicles sometimes drive themselves, sometimes are driven remotely by a computing system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive (e.g., steer and control speed) itself (e.g., in response to a destination requested by the human).

The remote computing device 12 can be a smartphone, a smartwatch, a tablet computer, a laptop computer, a desktop computer, augmented reality glasses, an implanted computer, and/or any type of computer.

A rider can bring her remote computing device 12 into the self-driving vehicle 2 and then can leave the self-driving vehicle 2 with her remote computing device 12. In some embodiments, the rider requests a ride at her home with a remote computing device 12, but then leaves the remote computing device 12 at home when she goes to get a ride from the vehicle 2.

In some embodiments, the remote computing device 12 is an iPhone made by Apple Inc. or an Android phone based on software made by Alphabet Inc. The remote computing device 12 can comprise a speaker configured to emit sounds, a microphone configured to record sounds, and a display screen configured to display images. The remote computing device 12 can comprise a battery configured to provide electrical power to operate the remote computing device 12.

In some embodiments, portions of the vehicle management system 65 can be physically coupled to the self-driving vehicle 2 while other others of the vehicle management system 65 are not physically coupled to the vehicle 2 and are located remotely relative to the vehicle 2.

In some embodiments, at least a portion of the vehicle management system 65 is located in the vehicle 2. In several embodiments, at least a portion of the vehicle management system 65 is located remotely relative to the vehicle 2. The vehicle management system 65 can comprise many servers, computers, and vehicles. The vehicle management system 65 can comprise cloud computing and cloud storage.

In several embodiments, the entire vehicle management system 65 is located in the self-driving vehicle 2. The vehicle 2 can comprise the vehicle management system 65. In some embodiments, a first portion of the vehicle management system 65 is physically coupled to the vehicle 2, and a second portion of the vehicle management system 65 is not physically coupled to the vehicle 2. The second portion can be located remotely relative to the vehicle 2. In several embodiments, the entire vehicle management system 65 is located remotely relative to the vehicle 2.

The phrase "communicatively coupling" can include any type of direct and/or indirect coupling between the self-driving vehicle 2, remote computing device 12, and vehicle management system 65. For example, the remote computing device 12 can be communicatively coupled to the vehicle management system 65 via servers, the Cloud, the Internet, satellites, Wi-Fi networks, cellular networks, and any other suitable communication means.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps can be installed directly on remote computing devices, whereby developers can create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The invention claimed is:

1. A vehicle management system comprising:
   a vehicle having a vehicle navigation system, wherein the vehicle management system is configured to send a first pick-up location to the vehicle navigation system;
   a remote computing device of a first rider, wherein the remote computing device comprises an accelerometer configured to monitor accelerations of the remote computing device as the first rider carries the remote computing device;
   a location tracking system configured to monitor a location of the remote computing device of the first rider; and
   program instructions configured to analyze movements of the first rider by analyzing the accelerations, wherein the program instructions are configured to cease directing the vehicle toward the first pick-up location and instead direct the vehicle to the location of the remote computing device of the first rider in response to determining that the accelerations are indicative of the movements being less than a predetermined threshold.

2. The vehicle management system of claim 1, wherein the vehicle management system comprises a rendezvous mode in which the vehicle management system is configured to direct both the vehicle and the first rider toward the first pick-up location, and
   the vehicle management system comprises a rescue mode in which the vehicle management system is configured to direct the vehicle toward the location of the remote computing device of the first rider,
   wherein the vehicle management system is configured to exit the rendezvous mode and enter the rescue mode in response to determining, by the location tracking system, that the first rider is moving away from the first pick-up location.

3. The vehicle management system of claim 1, wherein the program instructions are configured to cease directing the vehicle toward the first pick-up location and instead direct the vehicle to the location of the remote computing device of the first rider in response to determining that the accelerations are indicative of the movements being less than the predetermined threshold and in response to determining that a previously scheduled pick-up time for the first rider has passed.

4. The vehicle management system of claim 1, further comprising a communication system configured to send the first pick-up location to the remote computing device, wherein the communication system is configured to send a first wireless communication to the remote computing device, and the first wireless communication is configured to enable the remote computing device to direct the first rider toward the first pick-up location.

5. The vehicle management system of claim 4, wherein the communication system is configured to send a second wireless communication to the remote computing device in response to the location tracking system determining that the remote computing device of the first rider is moving away from a first walking route to the first pick-up location, and the second wireless communication is configured to prompt the remote computing device to present an option for the first rider to replace the first pick-up location with a second pick-up location.

6. The vehicle management system of claim 5, wherein the second pick-up location is located closer than the first pick-up location to the location of the remote computing device of first rider.

7. A vehicle management system comprising:
a vehicle having a vehicle navigation system, wherein the vehicle management system is configured to send a first pick-up location to the vehicle navigation system;
a remote computing device, wherein the remote computing device comprises an accelerometer configured to monitor accelerations of a first rider as the first rider carries the remote computing device;
a location tracking system configured to monitor a location of the remote computing device; and
program instructions configured to analyze movements of the first rider by analyzing the accelerations, wherein the program instructions are configured to cease directing the vehicle toward the first pick-up location and instead direct the vehicle to the location of the remote computing device in response to determining that the accelerations are indicative of the first rider moving less than a predetermined distance during a predetermined time.

8. The vehicle management system of claim 7, wherein the program instructions are configured to cease directing the vehicle toward the first pick-up location and instead direct the vehicle to the location of the remote computing device in response to determining that the accelerations are indicative of the first rider moving less than the predetermined distance during the predetermined time and in response to determining that a previously scheduled pick-up time for the first rider is at least one of passed and within fifteen minutes.

9. The vehicle management system of claim 7, further comprising a communication system configured to send the first pick-up location to the remote computing device, wherein the communication system is configured to send a first wireless communication to the remote computing device, and the first wireless communication is configured to enable the remote computing device to direct the first rider toward the first pick-up location.

10. A vehicle management system comprising:
a vehicle having a vehicle navigation system, wherein the vehicle management system is configured to send a first pick-up location to the vehicle navigation system;
a remote computing device configured to be carried by a first rider and having an accelerometer configured to detect accelerations of the first rider as the first rider walks; and
program instructions configured to analyze the accelerations to analyze a gait of the first rider as the first rider walks, wherein the program instructions are configured to suggest the first pick-up location rather than a second pick-up location that is located farther away from the remote computing device in response to analyzing the gait.

11. The vehicle management system of claim 10, wherein the program instructions are configured to monitor a movement speed of the remote computing device as the first rider walks, and the vehicle management system further comprising a memory comprising the first pick-up location and the second pick-up location, wherein the program instructions are configured to suggest the first pick-up location rather than the second pick-up location in response to analyzing the movement speed.

12. The vehicle management system of claim 11, further comprising a location tracking system configured to monitor a location of the remote computing device, and wherein the program instructions are configured to suggest the first pick-up location rather than the second pick-up location in response to determining that the first pick-up location is located closer than the second pick-up location to the location of the remote computing device and in response to determining that the movement speed is less than a predetermined threshold.

13. The vehicle management system of claim 10, further comprising a memory comprising a profile indicative of movement speeds of the remote computing device as the first rider walks on at least two previous days, wherein the program instructions are configured to suggest the first pick-up location rather than the second pick-up location in response to analyzing the profile.

14. The vehicle management system of claim 13, further comprising a location tracking system configured to monitor a location of the remote computing device,
wherein the program instructions are configured to suggest the first pick-up location rather than the second pick-up location in response to determining that the second pick-up location is located farther than the first pick-up location from the location of the remote computing device and in response to determining that the profile indicates a walking ability that is less than a predetermined threshold.

15. The vehicle management system of claim 10, wherein the program instructions are configured to analyze the accelerations to determine a movement speed of the first rider, and the program instructions are configured to suggest the first pick-up location rather than the second pick-up location in response to determining that the movement speed is less than a predetermined threshold.

16. The vehicle management system of claim 10, further comprising a communication system configured to send the first pick-up location to the remote computing device, wherein the communication system is configured to send a first wireless communication to the remote computing device, and the first wireless communication is configured to enable the remote computing device to direct the first rider toward the first pick-up location.

17. The vehicle management system of claim 16, further comprising a location tracking system, wherein the communication system is configured to send a second wireless communication to the remote computing device in response to the location tracking system determining that the remote computing device is moving away from the first pick-up location, and the second wireless communication is configured to prompt the remote computing device to present an option for the first rider to replace the first pick-up location with a third pick-up location.

18. The vehicle management system of claim 10, wherein the vehicle management system comprises a rendezvous mode in which the vehicle management system is configured to direct both the vehicle and the first rider toward the first pick-up location, and
the vehicle management system comprises a rescue mode in which the vehicle management system is configured to direct the vehicle toward a location of the remote computing device, the vehicle management system further comprising a location tracking system configured to monitor the location of the remote computing device, wherein the vehicle management system is configured to exit the rendezvous mode and enter the rescue mode in response to determining, by the location tracking system, that the remote computing device is moving away from the first pick-up location.

19. A method of using a vehicle management system, the method comprising:

receiving, by the vehicle management system, a first pick-up location for a first rider;

directing, by the vehicle management system, a vehicle to move toward the first pick-up location by following a first driving route;

directing, by the vehicle management system, the first rider to move toward the first pick-up location by following a first walking route; and after directing the vehicle and the first rider to move toward the first pick-up location, analyzing, by an accelerometer of a remote computing device of the first rider, a first movement speed of the first rider, and choosing, by the vehicle management system, a second pick-up location located away from the first pick-up location and located closer than the first pick-up location to a location of the remote computing device of the first rider in response to determining, by the vehicle management system, that the first movement speed is less than a predetermined threshold.

20. The method of claim 19, further comprising, after directing the vehicle and the first rider to move toward the first pick-up location:

monitoring, by the vehicle management system, the location of the remote computing device, determining, by the vehicle management system based on monitoring the location, that the first rider is moving away from the first walking route, and suggesting, by the vehicle management system, the second pick-up location to replace the first pick-up location in response to determining that the first rider is moving away from the first walking route.

21. The method of claim 19, further comprising directing, by the vehicle management system, the vehicle to move toward the second pick-up location by following a second driving route.

22. The method of claim 19, further comprising:

receiving, by the vehicle management system from the first rider, an acceptance of the second pick-up location, directing, by the vehicle management system, the vehicle to move toward the second pick-up location by following a second driving route, and directing, by the vehicle management system, the first rider to move toward the second pick-up location by following a second walking route.

23. The method of claim 19, wherein the vehicle management system comprises a rendezvous mode in which the vehicle management system directs both the vehicle and the first rider toward the first pick-up location, and the vehicle management system comprises a rescue mode in which the vehicle management system directs the vehicle toward the location of the remote computing device of the first rider and prompts the first rider to remain at the location of the remote computing device, the method further comprising, after entering the rendezvous mode and directing the vehicle and the first rider toward the first pick-up location:

monitoring, by the vehicle management system, the location of the remote computing device of the first rider, and in response to determining that the first rider is moving away from the first walking route: exiting the rendezvous mode and entering the rescue mode.

24. The method of claim 19, further comprising, after directing the vehicle and the first rider to move toward the first pick-up location, determining that the first rider has moved away from the first walking route, and in response:

automatically directing, by the vehicle management system, the vehicle to move toward a third pick-up location by following a second driving route, and automatically directing, by the vehicle management system, the first rider to move toward the third pick-up location by following a second walking route.

25. The method of claim 19, further comprising, after directing the vehicle and the first rider to move toward the first pick-up location:

directing, by the vehicle management system, the vehicle to the second pick-up location in response to determining, by the vehicle management system, that the first rider has been inside an area for more than a predetermined time and in response to determining, by the vehicle management system, that a pick-up time has passed, wherein the area is located away from the first pick-up location and is less than at least one of 100 feet in diameter, 100 feet wide, and 100 feet long.

26. The method of claim 19, wherein the second pick-up location is within a predetermined distance of the location of the remote computing device of the first rider.

27. A method of using a vehicle management system, the method comprising:

receiving, by the vehicle management system, a first pick-up location for a first rider;

directing, by the vehicle management system, a vehicle to move toward the first pick-up location by following a first driving route;

directing, by the vehicle management system, the first rider to move toward the first pick-up location by following a first walking route; and after directing the vehicle and the first rider to move toward the first pick-up location, determining, by the vehicle management system, a location of a remote computing device of the first rider, analyzing, by an accelerometer of the remote computing device of the first rider, a first gait of the first rider, and choosing, by the vehicle management system, a second pick-up location located closer than the first pick-up location to the location of the remote computing device in response to analyzing the first gait.

28. The method of claim 27, further comprising directing, by the vehicle management system, the vehicle to move toward the second pick-up location by following a second driving route.

29. The method of claim 27, further comprising choosing, by the vehicle management system, the second pick-up location in response to comparing, by the vehicle management system, the first gait to a movement profile of the first rider, and directing, by the vehicle management system, the vehicle to the second pick-up location in response to the comparing.

30. The method of claim 27, further comprising directing, by the vehicle management system, the vehicle to the second pick-up location in response to determining, by the vehicle management system, that the first gait comprises at least one characteristic that is at least one of less than a first predetermined threshold and greater than a second predetermined threshold.

31. The method of claim 27, further comprising directing, by the vehicle management system, the vehicle to move toward the second pick-up location by following a second driving route, and directing, by the vehicle management system, the first rider to move toward the second pick-up location by following a second walking route.

32. The method of claim 27, further comprising directing, by the vehicle management system, the vehicle to the second pick-up location in response to determining, by the vehicle management system, that the first rider has been inside an area for more than a predetermined time, wherein the area is less than at least one of 100 feet in diameter, 100 feet wide, and 100 feet long.

33. The method of claim 27, further comprising comparing, by the vehicle management system, the first gait to a movement profile of the first rider, and directing, by the vehicle management system, the vehicle to the second pick-up location in response to the comparing.

* * * * *